United States Patent
Motoyama

(10) Patent No.: US 8,438,273 B2
(45) Date of Patent: May 7, 2013

(54) NETWORK DEVICE MANAGEMENT WITH SELF LEARNING CAPABILITY TO EXTRACT INFORMATION FROM A DEVICE

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 12/888,134

(22) Filed: Sep. 22, 2010

(65) Prior Publication Data

US 2012/0072577 A1    Mar. 22, 2012

(51) Int. Cl.
*G06F 15/173*    (2006.01)
(52) U.S. Cl.
USPC ........... 709/224; 709/206; 709/208; 709/228; 707/3
(58) Field of Classification Search .................. 709/223, 709/224, 232; 370/245; 710/8
See application file for complete search history.

(56) References Cited

U.S. PATENT DOCUMENTS

| | | | |
|---|---|---|---|
| 5,412,779 A | 5/1995 | Motoyama | |
| 5,537,554 A | 7/1996 | Motoyama | |
| 5,544,289 A | 8/1996 | Motoyama | |
| 5,568,618 A | 10/1996 | Motoyama | |
| 5,649,120 A | 7/1997 | Motoyama | |
| 5,774,678 A | 6/1998 | Motoyama | |
| 5,819,110 A | 10/1998 | Motoyama | |
| 6,473,812 B2 | 10/2002 | Motoyama | |
| 6,631,247 B1 | 10/2003 | Motoyama et al. | |
| 6,839,717 B1 | 1/2005 | Motoyama et al. | |
| 6,889,263 B2 | 5/2005 | Motoyama et al. | |
| 6,928,493 B2 | 8/2005 | Motoyama | |
| 6,970,952 B2 | 11/2005 | Motoyama | |
| 7,120,707 B2 | 10/2006 | Motoyama | |
| 7,185,080 B1 | 2/2007 | Motoyama | |
| 7,194,560 B2 | 3/2007 | Motoyama | |
| 7,209,952 B2 | 4/2007 | Fong et al. | |
| 7,289,995 B2 | 10/2007 | Motoyama et al. | |
| 7,293,081 B2 | 11/2007 | Motoyama et al. | |
| 7,296,079 B2 | 11/2007 | Motoyama et al. | |
| 7,337,242 B1 | 2/2008 | Motoyama et al. | |
| 7,359,969 B2 | 4/2008 | Motoyama et al. | |
| 7,383,359 B2 | 6/2008 | Motoyama et al. | |
| 7,437,452 B2 | 10/2008 | Motoyama | |

(Continued)

FOREIGN PATENT DOCUMENTS

EP    1 679 822 A1    7/2006

OTHER PUBLICATIONS

U.S. Appl. No. 10/225,290, filed Aug. 22, 2002, Motoyama.

(Continued)

*Primary Examiner* — Wing F Chan
*Assistant Examiner* — Rajeshwari Krishnan
(74) *Attorney, Agent, or Firm* — Oblon, Spivak, McClelland, Maier & Neustadt, L.L.P.

(57) ABSTRACT

A method and apparatus for extracting information from a network device. The method includes retrieving first device information from the network device using a first communication protocol, and attempting to determine a parameter value of interest based on the first device information. When the step of attempting to determine the parameter value of interest based on the first device information is unsuccessful, second device information is retrieved from the network device using a second communication protocol, and an attempt is made to determine the parameter value of interest based on the first device information and the second device information.

20 Claims, 27 Drawing Sheets

U.S. PATENT DOCUMENTS

| | | |
|---|---|---|
| 7,447,790 B2 | 11/2008 | Motoyama et al. |
| 7,447,809 B2 | 11/2008 | Motoyama |
| 7,451,247 B2 | 11/2008 | Motoyama |
| 7,457,889 B2 | 11/2008 | Motoyama |
| 7,467,195 B2 | 12/2008 | Motoyama et al. |
| 7,480,249 B2 | 1/2009 | Motoyama |
| 7,502,852 B2 | 3/2009 | Motoyama et al. |
| 7,512,681 B2 | 3/2009 | Motoyama et al. |
| 7,519,698 B2 | 4/2009 | Motoyama |
| 7,526,546 B2 | 4/2009 | Motoyama et al. |
| 7,533,086 B2 | 5/2009 | Motoyama et al. |
| 7,533,167 B2 | 5/2009 | Motoyama et al. |
| 7,533,344 B1 | 5/2009 | Motoyama et al. |
| 7,536,450 B2 | 5/2009 | Motoyama et al. |
| 7,552,111 B2 | 6/2009 | Motoyama et al. |
| 7,574,489 B2 | 8/2009 | Motoyama et al. |
| 7,596,749 B2 | 9/2009 | Motoyama et al. |
| 7,606,894 B2 | 10/2009 | Motoyama et al. |
| 7,610,372 B2 | 10/2009 | Motoyama et al. |
| 7,620,717 B2 | 11/2009 | Motoyama et al. |
| 7,620,718 B2 | 11/2009 | Motoyama et al. |
| 7,620,744 B2 | 11/2009 | Motoyama |
| 7,647,397 B2 | 1/2010 | Motoyama et al. |
| 7,656,293 B2 | 2/2010 | Fong et al. |
| 7,664,886 B2 | 2/2010 | Motoyama et al. |
| 7,801,977 B2 | 9/2010 | Motoyama et al. |
| 2002/0007390 A1 | 1/2002 | Motoyama |
| 2004/0068549 A1 | 4/2004 | Motoyama |
| 2004/0254915 A1* | 12/2004 | Motoyama et al. ............ 707/3 |
| 2005/0071483 A1 | 3/2005 | Motoyama |
| 2005/0177642 A1 | 8/2005 | Motoyama et al. |
| 2005/0240939 A1 | 10/2005 | Motoyama et al. |
| 2006/0031155 A1 | 2/2006 | Motoyama et al. |
| 2006/0085535 A1 | 4/2006 | Motoyama et al. |
| 2006/0184659 A1 | 8/2006 | Motoyama et al. |
| 2008/0065757 A1 | 3/2008 | Motoyama et al. |
| 2008/0098097 A1 | 4/2008 | Motoyama et al. |
| 2008/0126557 A1* | 5/2008 | Motoyama et al. ............ 709/232 |
| 2009/0077102 A1 | 3/2009 | Motoyama |
| 2010/0153549 A1 | 6/2010 | Motoyama et al. |

OTHER PUBLICATIONS

J. B. Postel, "Simple Mail Transfer Protocol," IETF, RFC 821, Aug. 1982. [Online]. Available: http://www.rtc-editor.orq/rfc/rfc821.txt.

D. H. Crocker, "Standard for the Format of ARPA Internet Text Messages," IETF, RFC 822, Aug. 13, 1982. [Online]. Available: http://www.rfc-editor.org/rfc/rfc822.txt.

N. Freed and N. Borenstein, "Multipurpose Mail Extensions (MIME) Part One: Format of Internet Message Bodies," IETF, RFC 2045, Nov. 1996. [Online]. Available: http://www.rfc-editor.org/rfc/rfc2045.txt.

J. Myers and M. Rose, "Post Office Protocol—Version 3," IETF, RFC 1939, May 1996. [Online]. Available: http://www.rfc-editor.org/rfc/rfc1939.txt.

R. Bergman, H. Lewis and I. McDonald, "Printer MIB v2," IETF, RFC 3805, Jun. 2004. [Online]. Available: http://www.rfc-editor.org/rfc/rfc3805.txt.

R. Smith, F. Wright, T. Hastings, S. Zilles, and J. Gyllenskog, "Printer MIB," IETF, RFC 1759, Mar. 1995. [Online]. Available: http://www.rfc-editor.org/rfc/rfc1759.txt.

Zwicky et al., "Building Internet Firewalls: $2^{nd}$ Edition," 2000, pp. 21-28 and pp. 122-156.

Stevens, "TCP/IP Illustrated, vol. 1: The Protocols," 1994, pp. 1-19 and pp. 441-447.

Extended European Search Report issued Feb. 3, 2012, in European Patent Application No. 11181251.7.

* cited by examiner

FIG. 12B

```
Variable =
printmib.prtMarkerSupplies.prtMarkerSuppliesTable.prtMarkerSuppliesEntry.prt
MarkerSuppliesDescription.1.1
Value   = Black Cartridge HP CB400A
Variable =
printmib.prtMarkerSupplies.prtMarkerSuppliesTable.prtMarkerSuppliesEntry.prt
MarkerSuppliesDescription.1.2
Value   = Cyan Cartridge HP CB401A
Variable =
printmib.prtMarkerSupplies.prtMarkerSuppliesTable.prtMarkerSuppliesEntry.prt
MarkerSuppliesDescription.1.3
Value   = Magenta Cartridge HP CB403A
Variable =
printmib.prtMarkerSupplies.prtMarkerSuppliesTable.prtMarkerSuppliesEntry.prt
MarkerSuppliesDescription.1.4
Value   = Yellow Cartridge HP CB402A
Variable =
printmib.prtMarkerSupplies.prtMarkerSuppliesTable.prtMarkerSuppliesEntry.prt
MarkerSuppliesDescription.1.5
Value   = Image Transfer Kit HP Q7504A
Variable =
printmib.prtMarkerSupplies.prtMarkerSuppliesTable.prtMarkerSuppliesEntry.prt
MarkerSuppliesDescription.1.6
Value   = Image Fuser Kit HP 110V-Q7502A, 220V-Q7503A
```

FIG. 12C

```
Variable =
printmib.prtMarkerSupplies.prtMarkerSuppliesTable.prtMarkerSuppliesEntry.prt
MarkerSuppliesSupplyUnit.1.1
Value   = 7
Variable =
printmib.prtMarkerSupplies.prtMarkerSuppliesTable.prtMarkerSuppliesEntry.prt
MarkerSuppliesSupplyUnit.1.2
Value   = 7
Variable =
printmib.prtMarkerSupplies.prtMarkerSuppliesTable.prtMarkerSuppliesEntry.prt
MarkerSuppliesSupplyUnit.1.3
Value   = 7
Variable =
printmib.prtMarkerSupplies.prtMarkerSuppliesTable.prtMarkerSuppliesEntry.prt
MarkerSuppliesSupplyUnit.1.4
Value   = 7
Variable =
printmib.prtMarkerSupplies.prtMarkerSuppliesTable.prtMarkerSuppliesEntry.prt
MarkerSuppliesSupplyUnit.1.5
Value   = 7
Variable =
printmib.prtMarkerSupplies.prtMarkerSuppliesTable.prtMarkerSuppliesEntry.prt
MarkerSuppliesSupplyUnit.1.6
Value   = 7
```

FIG. 12D

| 2210 Device ID | 2220 Vector of Extraction Structure {Method reference, Data reference} |
|---|---|
| 2230 123456789 | < {reference to 2110, reference to 2140}, {......} {......} 2240 > |
|  |  |

FIG. 22

NETWORK DEVICE MANAGEMENT WITH SELF LEARNING CAPABILITY TO EXTRACT INFORMATION FROM A DEVICE

CROSS-REFERENCE TO RELATED APPLICATIONS

This application is related to the following: U.S. patent application Ser. No. 09/408,443 filed on Sep. 29, 1999 (now U.S. Pat. No. 6,631,247); U.S. patent application Ser. No. 10/665,536 filed on Sep. 22, 2003; U.S. patent application Ser. No. 10/638,540 filed on Aug. 12, 2003 (now U.S. Pat. No. 7,383,359); U.S. patent application Ser. No. 10/660,527 filed on Sep. 12, 2003 (now U.S. Pat. No. 7,293,081); U.S. patent application Ser. No. 08/738,659 filed Oct. 30, 1996 (now U.S. Pat. No. 6,889,263), which is a divisional of U.S. patent application Ser. No. 08/463,002 filed on Jun. 5, 1995 (now U.S. Pat. No. 5,819,110); U.S. patent application Ser. No. 09/393,677 filed on Sep. 10, 1999 (now U.S. Pat. No. 7,533,344); U.S. patent application Ser. No. 09/953,359 filed on Sep. 17, 2001 (now U.S. Pat. No. 7,536,450); U.S. patent application Ser. No. 09/975,939 filed on Oct. 15, 2001 (now U.S. Pat. No. 6,839,717); U.S. patent application Ser. No. 10/068,861 filed on Feb. 11, 2002 (now U.S. Pat. No. 7,337,242); U.S. patent application Ser. No. 10/142,991 filed on May 13, 2002 (now U.S. Pat. No. 7,209,952); U.S. patent application Ser. No. 10/157,903 filed on May 31, 2002 (now U.S. Pat. No. 7,647,397); U.S. patent application Ser. No. 10/225,290 filed on Aug. 22, 2002; U.S. patent application Ser. No. 10/328,003 filed on Dec. 26, 2002 (now U.S. Pat. No. 7,289,995); U.S. patent application Ser. No. 10/372,939 filed on Feb. 26, 2003 (now U.S. Pat. No. 7,437,452); U.S. patent application Ser. No. 10/460,151 filed on Jun. 13, 2003 (now U.S. Pat. No. 7,533,167); U.S. patent application Ser. No. 10/670,604 filed on Sep. 26, 2003; U.S. patent application Ser. No. 10/670,505 filed on Sep. 26, 2003 (now U.S. Pat. No. 7,519,698); U.S. patent application Ser. No. 10/764,582 filed on Jan. 27, 2004 (now U.S. Pat. No. 7,296,079); U.S. patent application Ser. No. 11/867,741 filed on Oct. 5, 2007 (now U.S. Pat. No. 7,447,790); U.S. patent application Ser. No. 10/764,467 filed on Jan. 27, 2004 (now U.S. Pat. No. 7,606,894); U.S. patent application Ser. No. 10/76,569 filed on Jan. 27, 2004 (now U.S. Pat. No. 7,610,372); U.S. patent application Ser. No. 10/764,527 filed on Jan. 27, 2004; U.S. patent application Ser. No. 10/913,337 filed on Aug. 9, 2004; U.S. patent application Ser. No. 10/913,431 filed on Aug. 9, 2004; U.S. patent application Ser. No. 10/913,450 filed on Aug. 9, 2004 (now U.S. Pat. No. 7,359,969); U.S. patent application Ser. No. 11/032,192 filed on Jan. 11, 2005 (now U.S. Pat. No. 7,467,195); U.S. patent application Ser. No. 11/234,224 filed on Sep. 26, 2005 (now U.S. Pat. No. 7,502,852); U.S. patent application Ser. No. 11/234,322 filed on Sep. 26, 2005 (now U.S. Pat. No. 7,526,546); U.S. patent application Ser. No. 11/234,319 filed on Sep. 26, 2005 (now U.S. Pat. No. 7,512,681); U.S. patent application Ser. No. 11/234,323 filed on Sep. 26, 2005 (now U.S. Pat. No. 7,596,749); U.S. patent application Ser. No. 11/517,428 filed on Sep. 8, 2006 (now U.S. Pat. No. 7,664,886); U.S. patent application Ser. No. 11/517,378 filed on Sep. 8, 2006 (now U.S. Pat. No. 7,533,086); U.S. patent application Ser. No. 11/517,430 filed on Sep. 8, 2006 (now U.S. Pat. No. 7,552,111); U.S. patent application Ser. No. 11/517,362 filed on Sep. 8, 2006 (now U.S. Pat. No. 7,574,489); and U.S. patent application Ser. No. 11/517,363 filed on Sep. 8, 2006. The contents of each of those applications are incorporated herein by reference.

BACKGROUND OF THE INVENTION

1. Field of the Invention

Embodiments disclosed herein generally relate to the use of a network to support clients of a service who use devices provided by a service company or their own company. The embodiments are more particularly related to a management device for automatically determining a method to extract information of interest from one or more network devices using a plurality of communication protocols.

2. Discussion of the Background

Today, many companies support devices at a client site remotely. In order to remotely monitor the devices, the devices either send messages to a monitoring station or are monitored using a communication protocol such as the Simple Network Management Protocol (SNMP). One issue of monitoring the devices, however, is how to handle devices from different vendors. This issue arises because the values obtained by SNMP are generally different from vendor to vendor. Moreover, MIB support within even the same vendor may vary widely. In addition, SNMP allows for the use of private Management Information Bases (MIBs), in addition to standard MIBs. However, the meanings of the private MIBs frequently are not readily available. Further, in many cases, a hardware vendor decides not to support private MIB's from other vendors.

Further, many existing remote support systems address the data collection aspect of the remote support systems. Such systems are interested in how to transfer various data from the devices in the field to the monitoring devices. In many cases, however, the actual data collection is not flexible and lacks the capability to self-adjust to newer devices connected to the network.

At the present time, many remote support systems deterministically support the devices in the field or require human intervention to update the remote support systems in order to support a multi-vendor environment. These remote support systems tend to respond to the incoming information according to a preprogrammed fashion instead of adapting to the dynamically changing devices and network environment.

Thus, there exists an unmet need in the art for a remote support system including multi-vendor devices to accommodate decision-making and a flexible response according to the dynamically changing devices and network environment.

SUMMARY OF THE INVENTION

One object of the disclosed embodiments is to provide a remote support system that utilizes multiple communication protocols, for example, printer Job Language (PJL), SNMP and the Hypertext Transfer Protocol with the Hypertext Markup Language (HTTP/HTML) to add a new capability of extracting necessary information from new devices that have not been supported previously. In other embodiments, the remote support system utilizes the extensible markup language (XML) in addition to, or as a substitute for, HTTP/HTML. For example, XML files are provided by some models of Hewlett Packard printers.

The information accessible using SNMP is defined by different standard MIBs, which are used to identify parameter values of different devices such as a system, interface, host, printer, etc. Further, the information provided by HTTP/HTML is provided by the network device and normally viewed by a human. Because HTML is human-readable, the displayed message is more easily interpreted than the information returned through SNMP. The disclosed embodiments target the automatic extraction of the information provided by HTTP/HTML to supplement the information provided by SNMP.

Another object of the disclosed embodiments is to expand the number of devices supported by the remote support system according to the context provided by the environments. In one embodiment, a remote support system of one or more particular vendors is assumed to obtain as much information as it can using at least one private MIB associated with the one or more particular vendors, but does not support private MIBs from other vendors. Accordingly, to acquire information from networked devices of other vendors, other protocols are used to obtain additional information to supplement the information obtained using one or more standard MIBs. For example, when a newer model of another vendor's device which is not previously available is connected to the network, the remote support system will find a method to extract as much information as it can to supplement information obtained via the one or more standard MIBs of SNMP.

Yet another object of the disclosed embodiments is to utilize information according to the human understandable information in an HTML web page, which may include information that is not available through standard MIB's of SNMP.

Another object of the disclosed embodiments is to provide methods to allow support for more protocols to communicate with the devices.

According to an embodiment, a method is provided for using a management device to extract information from a network device. The method includes retrieving first device information from the network device using a first communication protocol, and attempting to determine a parameter value of interest based on the first device information. When the step of attempting to determine the parameter value of interest based on the first device information is unsuccessful, second device information is retrieved from the network device using a second communication protocol, and an attempt is made to determine the parameter value of interest based on the first device information and the second device information.

According to another embodiment, the method further includes, when the step of attempting to determine the parameter value of interest based on the first device information and the second device information is successful, determining whether device information necessary to determine the parameter value of interest can be retrieved using the first communication protocol, and storing a method of extracting the device information necessary to determine the parameter value of interest from the network device based on the determination by the determining step, and information on how to determine the parameter value of interest from the extracted necessary device information.

According to another embodiment, the method further includes, when the step of attempting to determine the parameter value of interest based on the first device information is successful, retrieving the second device information from the network device using the second communication protocol, and attempting to verify the determined parameter value of interest based on the second device information.

According to another embodiment, the method further includes when the determined parameter value of interest is successfully verified in the step of verifying, storing a method of extracting device information necessary to determine the parameter value of interest from the network device via the first communication protocol, and information on how to determine the parameter value of interest from the extracted necessary device information.

According to another embodiment, the step of retrieving the first device information includes retrieving the first device information using the Simple Network Management Protocol (SNMP). Further, the step of retrieving the second device information includes retrieving at least one web page of the network device using the Hypertext Transfer Protocol (HTTP).

According to yet another embodiment, the method further includes obtaining identification information from the network device using the first communication protocol. Further, whether extraction information for the network device is stored in a memory, is determined based on the obtained identification information. When the step of determining whether the extraction information for the network device is stored determines that the extraction information for the network device is not stored in the memory, performing the steps of retrieving the first device information, attempting to determine the parameter value of interest based on the first device information, and, when the step of attempting to determine the parameter value of interest based on the first device information is unsuccessful, retrieving the second device information and attempting to determine the parameter value of interest based on the first device information and the second device information.

Further, according to additional embodiments, there are provided one or more computer-readable storage mediums having embedded therein instructions, which when executed by a computer, cause the computer to perform the various embodiments of the method of extracting information from the network device, as discussed above.

According to another embodiment, there is provided a management device for extracting information from a network device. The management device includes a memory and a processor. The processor is configured to retrieve first device information from the network device using a first communication protocol; to attempt to determine a parameter value of interest based on the first device information; and when the attempt to determine the parameter value of interest based on the first device information by the processor is unsuccessful, to retrieve second device information from the network device using a second communication protocol, and to attempt to determine the parameter value of interest based on the first device information and the second device information.

According to a further embodiment, the processor is configured, when the attempt by the processor to determine the parameter value of interest based on the first device information and the second device information is successful, to determine whether device information necessary to determine the parameter value of interest can be retrieved using the first communication protocol, and to store a method of extracting the device information necessary to determine the parameter value of interest from the network device based on the determination by the processor, and information on how to determine the parameter value of interest from the extracted necessary device information.

According to a further embodiment, the processor is further configured, when the attempt by the processor to determine the parameter value of interest based on the first device information is successful, to retrieve the second device information from the network device using the second communication protocol, and to attempt to verify the determined parameter value of interest based on the second device information.

According to a further embodiment, the processor is configured, when the determined parameter value of interest is successfully verified by the processor, to store a method of extracting device information necessary to determine the parameter value of interest from the network device via the first communication protocol, and information on how to determine the parameter value of interest from the extracted necessary device information.

According to a further embodiment, the processor is configured to retrieve the first device information using the Simple Network Management Protocol (SNMP), and to retrieve the second device information, which comprises at least one web page of the network device, using the Hypertext Transfer Protocol (HTTP).

According to yet a further embodiment, the processor is configured to obtain identification information from the network device using the first communication protocol and to determine whether extraction information for the network device is stored in the memory, based on the obtained identification information. Further, when the processor determines that the extraction information for the network device is not stored in the memory, the processor is configured to retrieve the first device information, to attempt to determine the parameter value of interest based on the first device information, and, when the attempt by the processor to determine the parameter value of interest based on the first device information is unsuccessful, to retrieve the second device information and to attempt to determine the parameter value of interest based on the first device information and the second device information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 12A to 12D illustrate examples of information obtained through HTTP/HTML and SNMP regarding toner levels;

FIG. 22 illustrates an exemplary reference to an information extraction method.

DETAILED DESCRIPTION OF THE PREFERRED EMBODIMENTS

Figure 1:
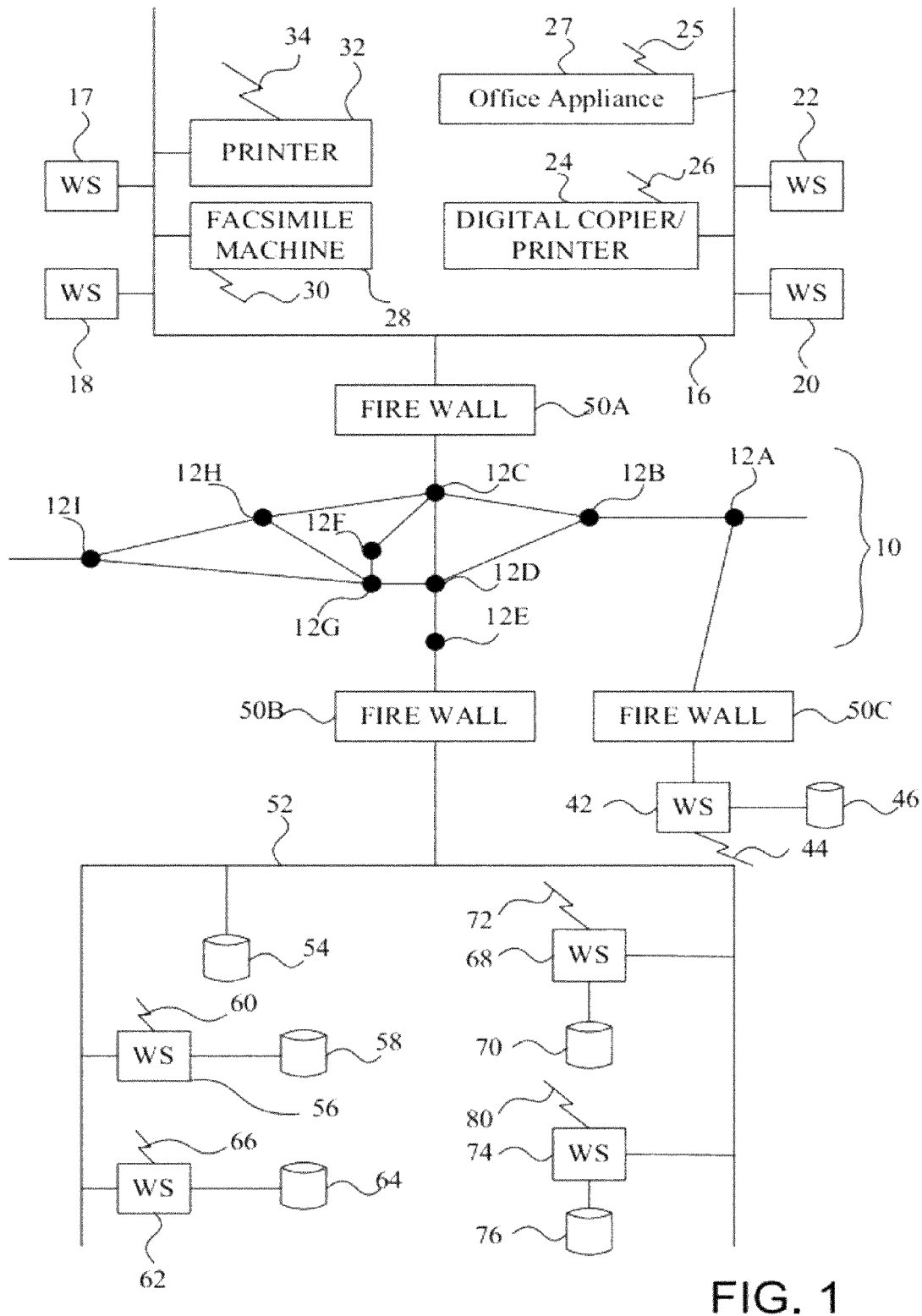
FIG. 1 illustrates three networked business office machines connected to network computers and databases through the Internet.

Referring now to the drawings, wherein like reference numerals designate identical or corresponding parts throughout the several views.

Referring to FIG. 1, there is a first network 16, such as a Local Area Network ("LAN") or Wide Area Network ("WAN"), connected to computers/workstations, 17, 18, 20, and 22. The computers/workstations can be any type of computers including Microsoft Window computers, Unix based computers, Apple Macintoshes, Linux based computers, or Laptop computers with wireless connections. Also connected to the first network 16 are a digital copier/printer multi-function machine 24, office appliance 27 such as a digital filing appliance, facsimile machine 28 and a printer 32. The appliances/devices 24, 27, 28, and 32 are referred to as machines or networked devices and other types of appliances/devices may be used as the machines or networked devices including any of the appliances/devices discussed below. Also, a facsimile server (not illustrated) may be connected to the first network 16 and may have a telephone, ISDN (Integrated Service Digital Network) or other communication connection. In addition to the appliances/devices 24, 27, 28, and 32 being connected to the first network 16, each of these appliances/devices may also include one or a combination of a conventional telephone connections, cable connections, and wireless connections 26, 25, 30, and 34, respectively. As explained below, in one embodiment, the business office machines or business appliances/devices 24, 27, 28, and 32 communicate with a remote management, diagnosis and control station, also referred to as a Service Center, through the Internet 10 via the first network 16 or by wireless connections 26, 25, 30, and/or 34. Alternatively, the office appliance 27 may function as a management appliance 1012 and may manage (e.g., by monitoring) the appliances/devices 24, 30, and 32 and communicate with the Service Center through the Internet 10. Another alternative is that one of the computers/workstations such as computer/workstation 22 acts as the management appliance 1012 that exchanges the information to and from the appliances/devices 24, 27, 28, and 32 and corresponds with the Service Center.

In FIG. 1, the Internet 10 includes a plurality of interconnected computers and routers designated by 12A-12I. The manner of communicating over the Internet is known through Request For Comments ("RFC") documents obtained through the "rfc.html" web page, on the world wide web at "ietf.org". TCP/IP (Transmission Control Protocol/Internet Protocol) related communication is described for example in the book "TCP/IP Illustrated Vol. 1, The Protocol" by Stevens, from Addison-Wesley Publishing Company, 1994, which is incorporated herein by reference.

In FIG. 1, a firewall 50A is connected between the Internet 10 and the first network 16. A firewall is a device or a system that allows interfacing with the Internet 10 at a carefully controlled point and prevents attackers from getting close to other network defenses. Firewalls are known and commercially available devices and/or software. Similarly, a firewall 50B is connected between the Internet 10 and a second network 52. Also, a firewall 50C is connected between the Internet 10 and a computer/workstation 42. The computer/workstation 42 may be connected to the second network 52 through a VPN (Virtual Private Network). Additional details on firewalls can be found in "Building Internet Firewalls" by D. B. Chapman and E. D. Zwicky, 1995, O'Reilly & Associates, Inc., the contents of which are incorporated herein by reference.

The second network 52 is a network for a company and includes a plurality of computers/workstations 56, 62, 68, and 74. These computers/workstations may be located within different departments of the company such as marketing, manufacturing, design engineering, and customer service departments. In addition to the computers/workstations connected via the second network 52, there is a computer/workstation 42 which is not directly connected to the second network 52. Information in a database stored in a disk 46 may be shared using proper protocols over the Internet to the computers/workstations connected directly to the second network 52. Also, the computer/workstation 42 includes another communication channel 44 for redundancy. The computers/workstations 42, 56, 62, 68, and 74 described here are abstract machines and may consist of multiple of computers when implemented.

Once the information of a networked office device gets to the second network 52, there may be a computer that parses the incoming information and routes the information to the correct destination computer/workstation for further processing. Information of the business office machines, business devices, or business office appliances 24, 27, 28, and 34 may be stored in one or more of the databases stored in the disks 46, 54, 58, 64, 70 and 76. Known databases include (1) relational databases from Microsoft, Oracle and Sybase and (2) a non-relational database such as an Object-Oriented database. Each of the customer service, marketing, manufacturing, and engineering departments may have their own database or may share from one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database, and disk 76 contains the customer service database. Alternatively, the disk 54 and 46 store one or more of the databases.

In addition to the computers/workstations 56, 62, 68, and 74 being connected to the Internet through the firewall 50B, these computers/workstations may also have different communication channels for redundancy. Such channels may include wireless communication.

A feature of the disclosed embodiments is the use of a "store-and-forward" mode of communication (e.g., Internet electronic mail) or transmission between a set of machines/appliances/devices and a set of computers for supporting the clients who use these machines/appliances/devices. Alternatively, the message which is transmitted may be implemented using a mode of communication that makes direct, end-to-end connection (e.g., using a socket connection to the ultimate destination) such as FTP and HTTP.

Figure 2:
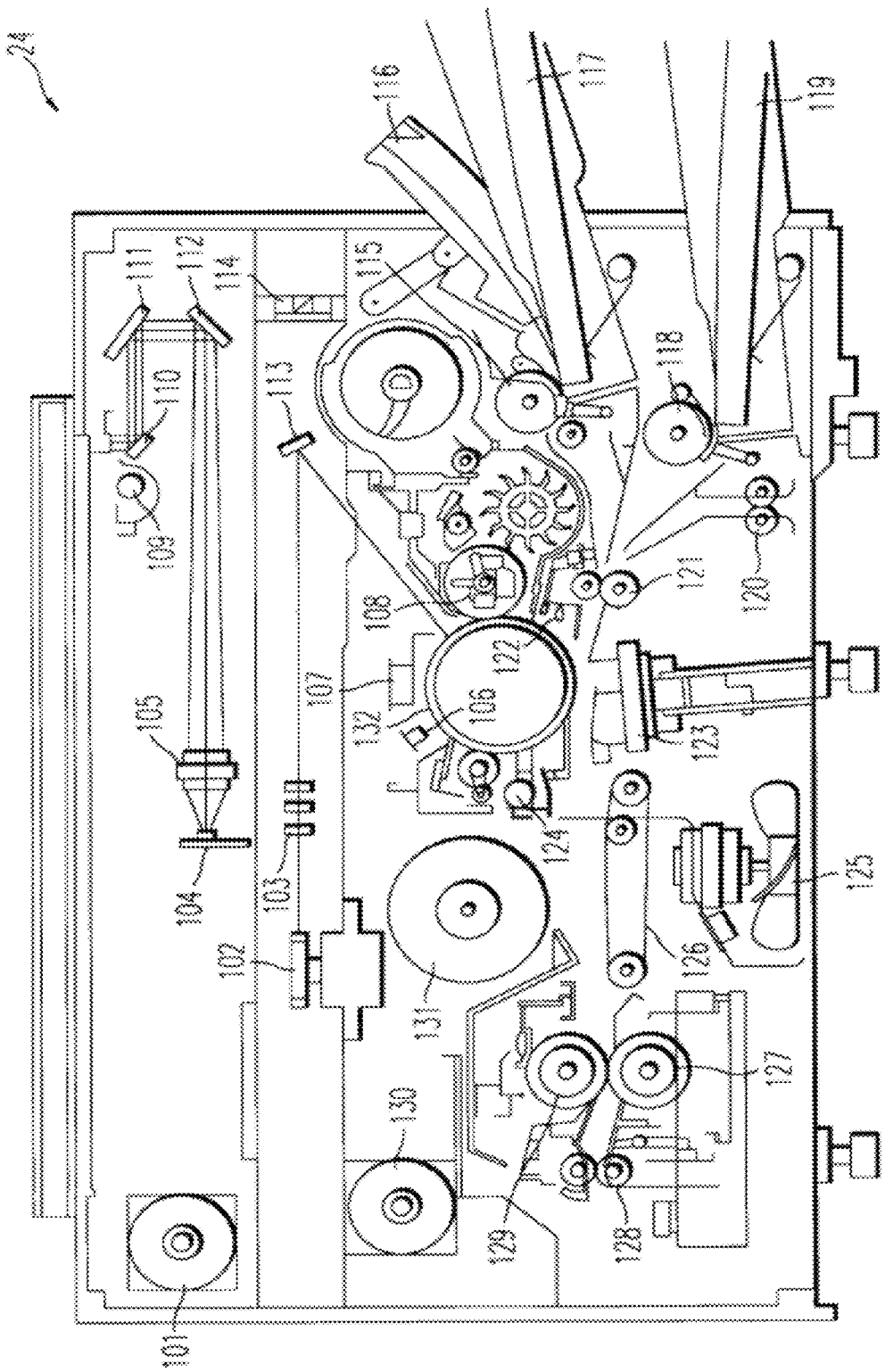
FIG. 2 illustrates the components of an exemplary digital copier/printer multi-function machine.

FIG. 2 illustrates an exemplary mechanical layout of the digital copier/printer multi-function machine 24 illustrated in FIG. 1. In FIG. 2, 101 is a fan for the scanner, 102 is a polygon mirror used with a laser printer, and 103 designates an F theta lens used to collimate light from a laser (not illustrated). Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer multi-function machine 24, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier/printer multi-function machine 24.

Figure 3:
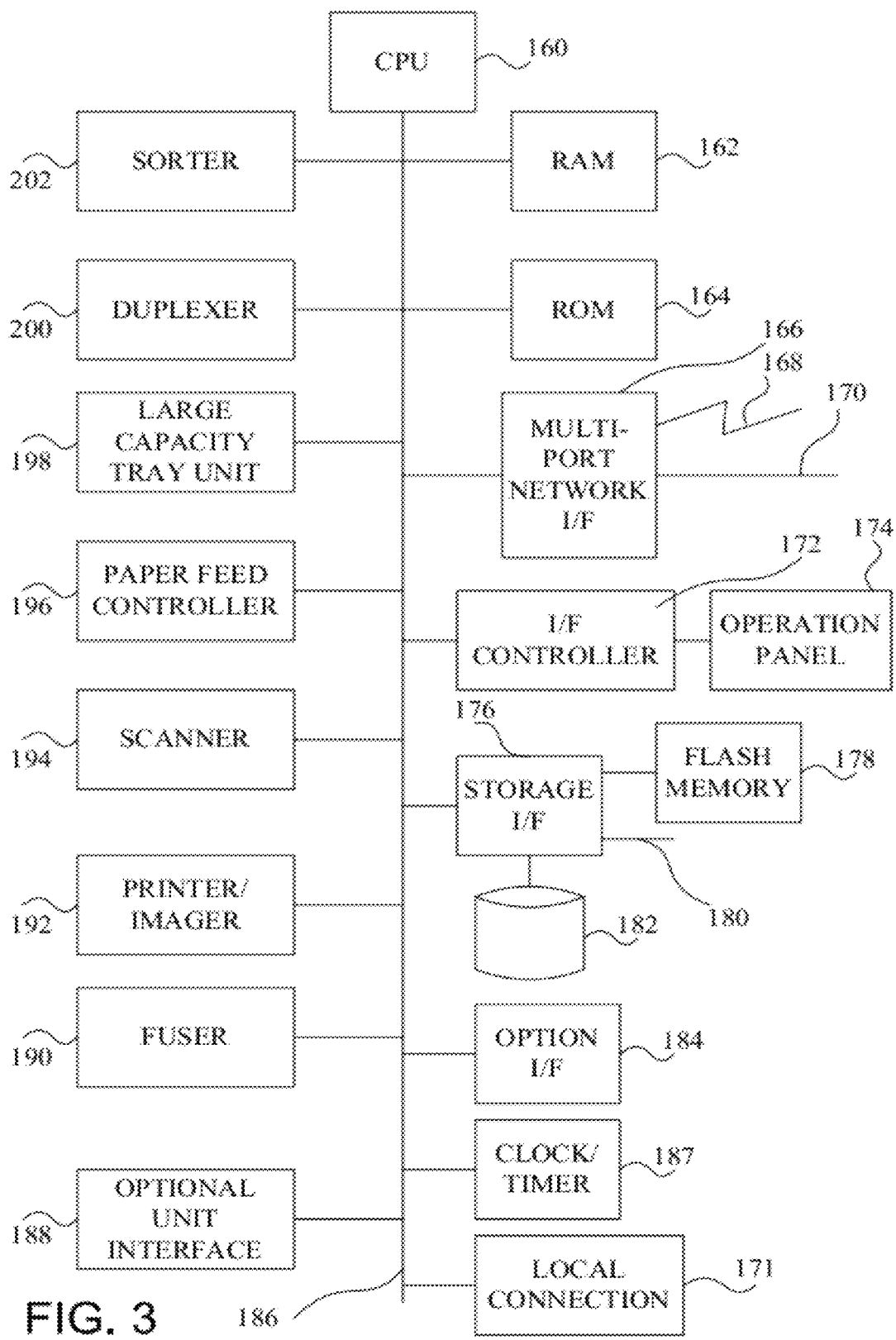
FIG. 3 illustrates the electronic components of the digital copier/printer multi-function machine illustrated in FIG. 2.

FIG. 3 illustrates a block diagram of the electronic components illustrated in FIG. 2. The CPU 160 is a microprocessor and acts as the system controller. There is a random access memory (RAM) 162 to store dynamically changing information (e.g., dynamic state data) including operating parameters of the digital copiers. A read only memory (ROM) 164 stores the program code used to run the digital copier/printer multi-function machine 24 and also information describing the static-state data such as model number, serial number and default parameters that would not change over the life of the machine. When the device needs to boot up from either hard disk or flash memory, then, the ROM memory 164 stores the boot sequence. A non-volatile memory such as a flash memory, EEPROM, and solid state drive (SSD) can store the information that seldom changes, such as options, IP address, and network information.

There is a multi-port communication interface 166 which allows the digital copier/printer multi-function machine 24 to communicate with external devices. Reference numeral 168 represents a telephone or other communication line including wireless. Further information of the multi-port communication interface is described with respect to FIG. 4. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display may be included within the operation panel 174 to display parameters and messages of the apparatus. The operation panel also can be a touch panel where the display and function buttons may change according to the context of operation.

A local connection interface 171 is a connection through a local port such as RS232, USB, and IEEE 1394. This interface 171 allows external devices to be attached to the apparatus.

A storage interface 176 connects storage devices to the system bus 186. The storage devise include a flash memory 178 and a disk 182. There is a connection 180 connected to the storage interface 176 which allows for additional memory devices to be connected to the bus 176. The flash memory 178 is used to store semi-static data which describes parameters of the device which infrequently change over the life of the apparatus including the option configuration, network access parameters, and work group, and also can be used to store dynamic data which describes parameters dynamically changing such as print count. An option interface 184 allows additional option devices to be attached and controlled. A clock/timer 187 is utilized to keep track of both the time and date and also to measure elapsed time.

On the left side of FIG. 3, the various sections making up the digital copier/printer multi-function machine 24 are illustrated. Reference numeral 202 designates a sorter and contains sensors and actuators used to sort the output of the digital copier/printer multi-function machine 24. There is a duplex 200 which allows a duplex operation to be perfumed and includes conventional sensors and actuators. The digital copier/printer multi-function machine 24 includes a large capacity tray unit 198 which allows paper trays holding a large number of sheets to be used. The large capacity tray unit 198 includes conventional sensors and actuators.

A paper feed controller 196 is used to control the operation of feeding paper into and through the digital copier/printer multi-function machine 24. A scanner 194 is used to scan images into the machine and includes control system of conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital copier/printer multi-function machine 24 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an operational unit interface 188 used to connect an optional unit such as an automatic document feeder, a different type of sorter/collator, or other elements which can be added to the digital copier/printer multi-function machine 24.

Figure 4:
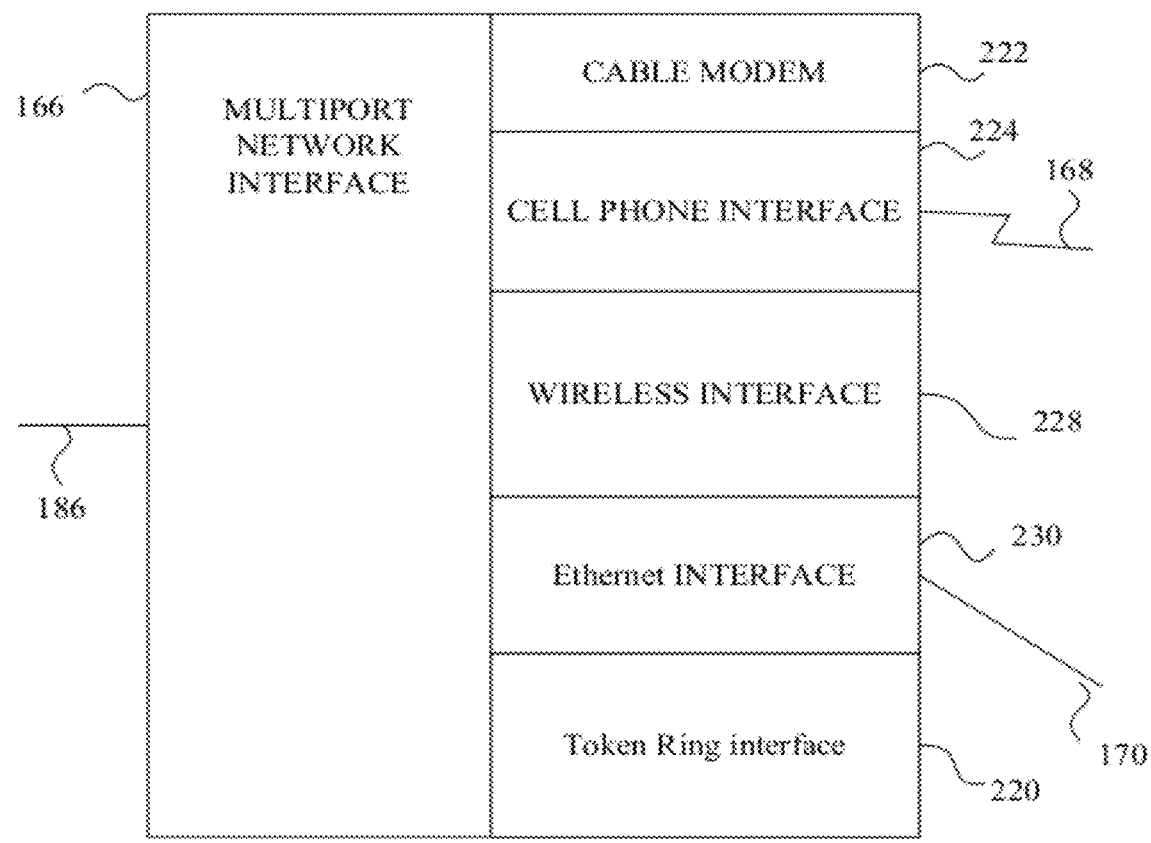
FIG. 4 illustrates details of the multi-port communication interface illustrated in FIG. 3.

FIG. 4 illustrates details of the multi-port network interface 166. The digital copier/printer multi-function machine 24 may communicate with external devices through a Token Rink interface 220, a cable modem unit 222 which has a high speed connection over cable, a cell phone interface 224 which connects to a cell phone line 168, wireless interface (A/B/G/N) 228, and an Ethernet interface 230. Other interfaces (not shown) include, but are not limited to, a Digital Subscriber line. However, in other embodiments the multi-port network interface 166 does not need to have all the interfaces described in FIG. 4.

The CPU 160 or other microprocessor or circuitry executes a monitoring process to monitor the state of each of the sensors of the digital copier/printer multi-function machine 24, and a sequencing process is used to execute the instructions of the code used to control and operate the machine. Additionally, there is (1) a central system control process executed to control the overall operation of the machine and (2) a communication process used to assure reliable communication to external devices connected to the digital copier/printer multi-function machine 24. The system control process monitors and controls data storage in a static state (e.g., the ROM 164 of FIG. 3), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine but the disclosed embodiments are equally applicable to other business office machines or devices such as an analog copier, a multi-function machine (MF), a projector, a facsimile machine, a scanner, a printer, a facsimile server, or other business office machines and business office appliances such as a router, firewall and small office router/firewall, or appliances (e.g., a microwave oven, digital camera, cellular phone, refrigerator, washer, dryer, visual audio system, DVD, etc.). Additionally, the disclosed embodiments includes other types of devices which operate using store-and-forward or direction connection-based communication. Such devices include metering systems (including gas, water, or electricity metering systems), parking meters, vending machines, or any mechanical devices (e.g., automobiles) that need to be monitored and serviced during operation.

Figure 5:
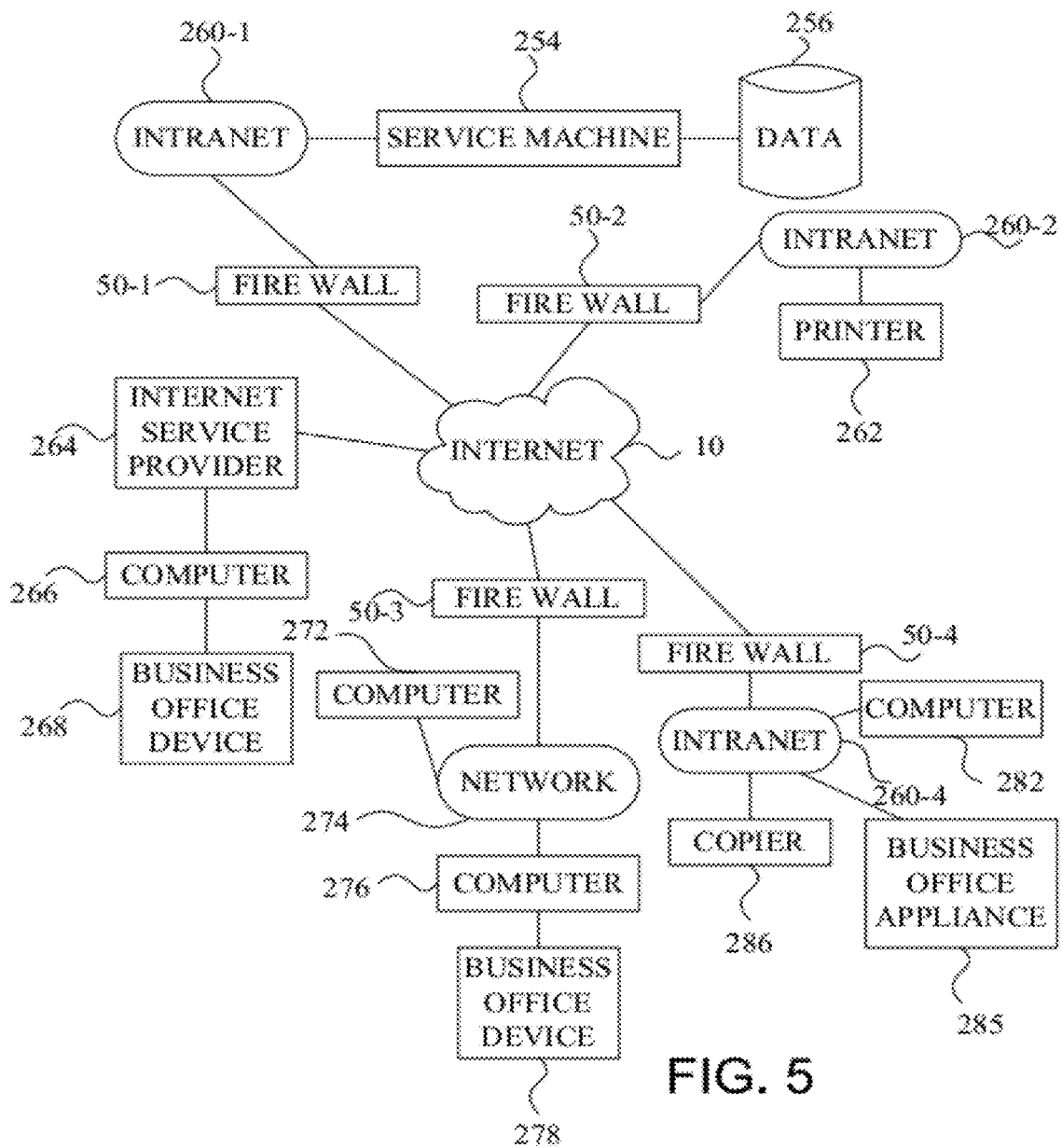
FIG. 5 illustrates an exemplary system configuration in which business office devices are connected to a computer which is connected to a network, and also devices which are connected directly to the network.

FIG. 5 illustrates an alternative system diagram of the invention in which different devices and subsystems are connected to the Internet 10. However, there is no requirement to have each of these devices or subsystems as part of the invention. Each component of the subsystem illustrated in FIG. 5 is individually part of the invention. Further, the elements illustrated in FIG. 1 may be connected to the Internet 10 which is illustrated in FIG. 5. In FIG. 5, there is illustrated a firewall 50-1 connected to an intranet 260-1. A service machine 254 connected to the intranet 260-1 includes therein or has connected thereto data 256 which may be stored in a database format. Alternatively, a service machine 254 is an abstract machine consisting of plural machines over the company intranet 260-1. Similarly, the data 256 may consist of plural databases spread over the intranet 260-1 or a Storage Area Network (SAN) with several databases. The data 256 includes history, performance, malfunction and any other information including statistical information of the operation, failure, or set-up of components or optional equipment of device/appliances which are being monitored. In addition, data of the devices/appliances interact with other information such as user and account in order to support the clients of the devices/appliances.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer). Although this subsystem shows only one printer, there can be more printers attached to the intranet 260-2 and more than one computer that use the printer(s) and are attached to the intranet 260-2.

An alternate type of sub-system includes the use of an Internet service provider 264 which may be any type of Internet service provider (ISP), including known commercial companies such as America Online, and Earthlink. In this sub-system, a computer 266 is connected to the ISP 264 through a telephone, cable, DSL wireless, or fiber optic communication via a modem or appropriate device. There may be a router/firewall device between the computer 266 and the modem. Further, a business office device 268 is connected to the computer 266. An alternative to a wired connection for the computer 266 and the business office device 268 is a wireless connection via a wireless router (not shown) connected to the ISP 264. As an alternative to the business office device 268 (and any other device illustrated in FIG. 5), a different type of machine may be monitored or controlled such as a digital copier, any type of appliance, security system or utility meter such as an electrical, water or gas utility meter, or any other device discussed herein. These machines may be connected to the Internet 10 directly without going through the computer 266 by using, for example, a wireless connection.

Also illustrated in FIG. 5 is a firewall 50-3 connected to a network 274. The network 274 may be implemented as any type of computer network including a LAN or WAN. Also, the network 274 may be implemented as an Intranet, if desired. A computer 272 connected to the network 274 may be used to obtain information from a business office device 278 and generate reports such as reports showing problems which occurred in various machines connected to the network and a monthly usage report of the devices connected to the network 274. The computer 272 acts as a resource management function within a company. Alternatively, the Service Machine may provide the same functions and sends the report to the computer 272 or allows Web access for the report. In addition, Service Machine may send an alert message to the computer 272 regarding the devices connected to the network. Such an alert may be a jam or toner alert of printers. In this embodiment, a computer 276 is connected between the business office device 278 and the network 274. This computer receives communications from the network and forwards the appropriate commands or data, or any other information to the business office device 278. Other network devices and appliances may be connected directly to the network 274. Communication between the business office device 278 and the computer 276 may be accomplished using wire-based or wireless methods including, but not limited to a radio frequency connection, electrical connection, and light connection (e.g., an infrared connection or a fiber optics connection). Similarly, each of the various networks and intranets illustrated in FIG. 5 may be established using any desired manner including through the establishment of wireless networks such as radio frequency networks. The wireless communication described herein may be established using spread spectrum technique which uses a spreading code and frequency hopping techniques such as Bluetooth.

Another sub-system illustrated in FIG. 5 includes a firewall 50-4, an intranet 260-4, a computer 282 connected thereto, a business office appliance 285, and a copier 286. The computer 282 may be used to access the service provided by the service machine 254 to check the company's aggregated data for an executive or may be used to interact with the service machine to support the devices on the intranet 260-4. Business office appliance 285 monitors the devices on the network including copier 286 or any of the other devices illustrated in or used with FIG. 5 which are covered by the contract and sends the monitored data to the service machine 254. The method of sending the monitored data includes e-mails described below.

Figure 6A:
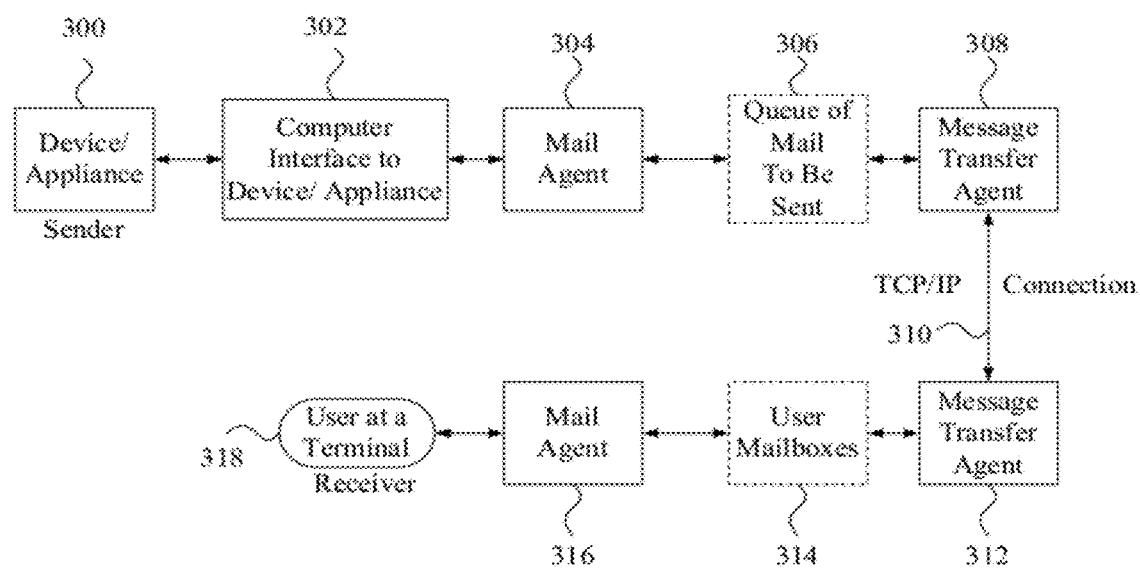
FIG. 6A is a block diagram illustrating an exemplary flow of information to and from a device/appliance using electronic mail.

FIG. 6A illustrates a device/appliance 300 connected to a typical e-mail exchange system which includes components 302, 304, 306, 308, 310, 312, 314, 316, and 318 which may be implemented in a conventional manner and are adapted from FIG. 28.1 of "TCP/IP Illustrated Volume 1" by Stevens above. A computer interface 302 interfaces with any of the application units or device/appliances 300 described herein. While FIG. 6A illustrates that the device/appliance 300 is the sender, the sending and receiving functions may be reversed in FIG. 6A. Furthermore, if desired, the user may not be needed to interface with the device/appliance 300 at all. The computer interface 302 may then interact with a mail agent 304. Popular mail agents for Windows are Outlook express and Outlook. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for the Unix system is Sendmail. Typically, the message transfer agents 308 and 312 exchange communication using a TCP/IP connection 310. Notably, the communication between the message transfer agents 308 and 312 may occur over any size network (e.g., WAN or LAN). Further, the message transfer agents 308 and 312 may utilize any communication protocol. Internet Engineering Task Force (IETF) published a series of RFC documents on the "rfc.htm" webpage located on the world wide web at "ietf.org" related to electronic mails including RFC 821 entitled "Simple Mail Transfer Protocol"; RFC 822 entitled "Standard for the Format of ARPA Internet Text Message"; RFC 2045 entitled "Multipurpose Internet Mail Extensions (MIME) Part One: Format of Internet Message Bodies"; RFC 1939 entitled "Post Office Protocol—Version 3". The contents of each of these references are incorporated herein by reference.

From the message transfer agent 312, e-mail messages are stored in user mailboxes 314 which are transferred to the mail agent 316 and ultimately transmitted to the user at the terminal 318, which functions as a receiving terminal. In one embodiment, the user at the terminal 318 is a resource administrator or a remote controller who may, e.g., be notified in the event of equipment failure.

The e-mail system that uses the "store-and-forward" process relieves the need to have a direct connection between the sending terminal 300 and receiving terminal 318. Most large companies prefer device information to flow in one direction, not allowing direct access to their internal network (Intranet). In addition, the e-mails can be archived at the sending company's e-mail system allowing for audit trails if necessary.

As the Internet is a network accessible by many users, it is not considered to be secure. Therefore, messages transmitted over the Internet should be encrypted to keep the messages confidential. Encryption mechanisms are known and widely used. Some operating systems come with encryption software. For example, SunOS 5.8 contains a crypt command to encrypt and decrypt the contents of a file.

Figure 6B:
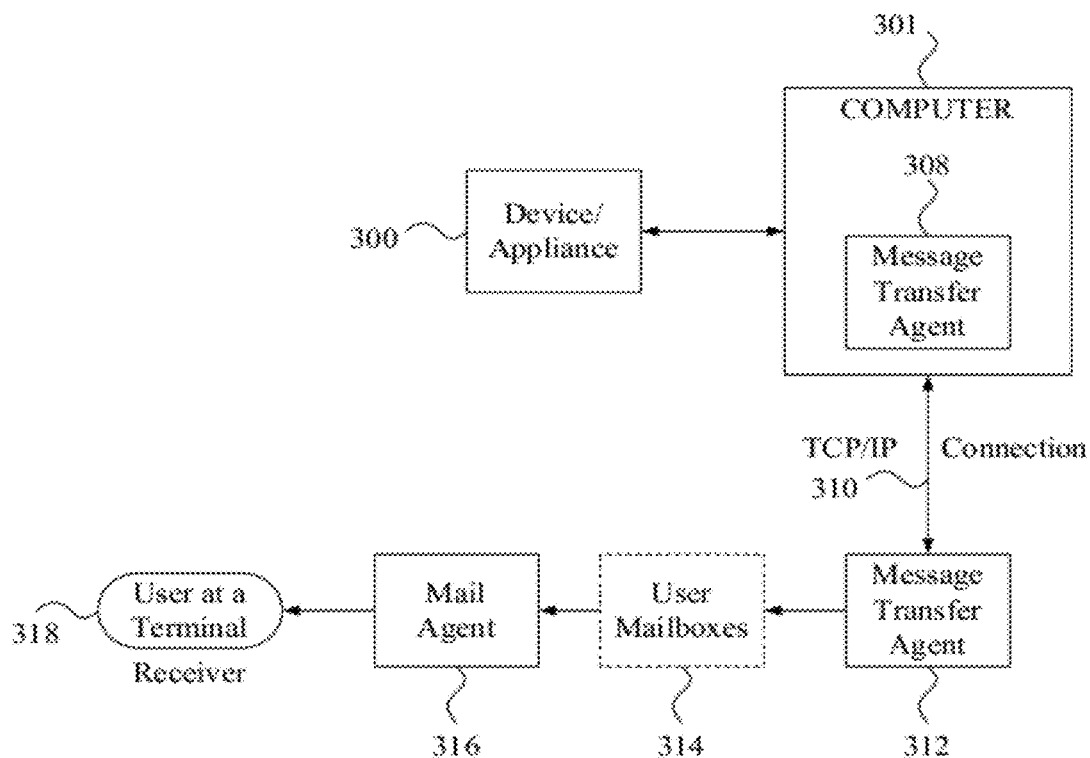
FIG. 6B illustrates an exemplary method of communicating using electronic mail in which the computer which is connected to the device/appliance also serves as a message transfer agent.

As an alternative to the general structure of FIG. 6A, a single computer may be used which functions as the computer interface 302, the mail agent 304, the mail queue 306, and the message transfer agent 308. As illustrated in FIG. 6B, the device/appliance 300 is connected to a computer 301 which includes the message transfer agent 308.

Figure 6C:
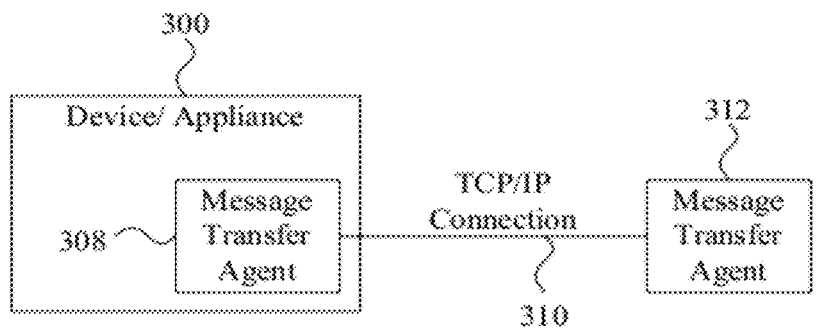
FIG. 6C illustrates an exemplary manner of communicating using electronic mail in which the device/appliance includes a message transfer agent.

A further alternative structure is shown in FIG. 6C, in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 and has an e-mail capability. Many printers, including printers from HP and Xerox, have the capability to send an alert notification to registered e-mail addresses.

Figure 6D:
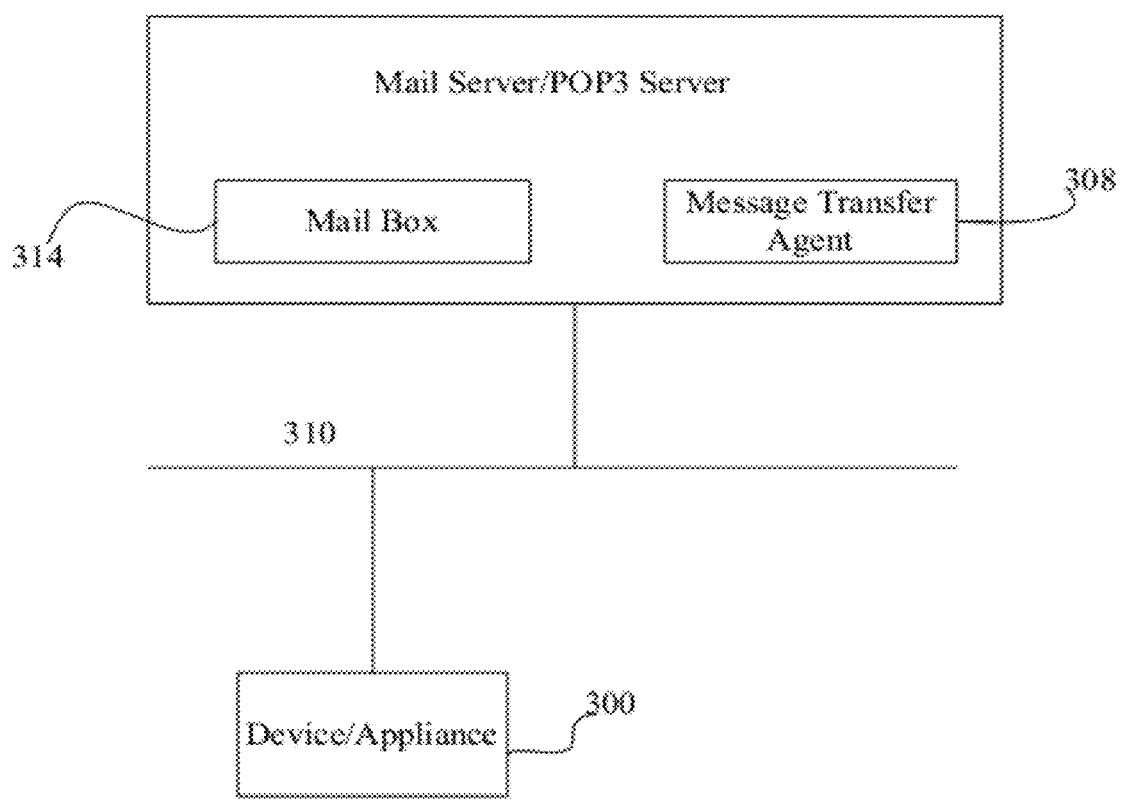
FIG. 6D illustrates an exemplary method of communicating using electronic mail in which a mail server acts as a POP3 server to receive mail for a device/appliance and as an SMTP server to send mail for the device/appliance.

FIG. 6D illustrates a system in which a device/appliance 300 does not itself have the capability to directly receive an e-mail, but has a connection 310 to a mail server/POP3 server including a message transfer agent 308 and a mail box 314, so that the device/appliance 300 uses the POP3 protocol to retrieve received mail from the mail server.

Figure 7:
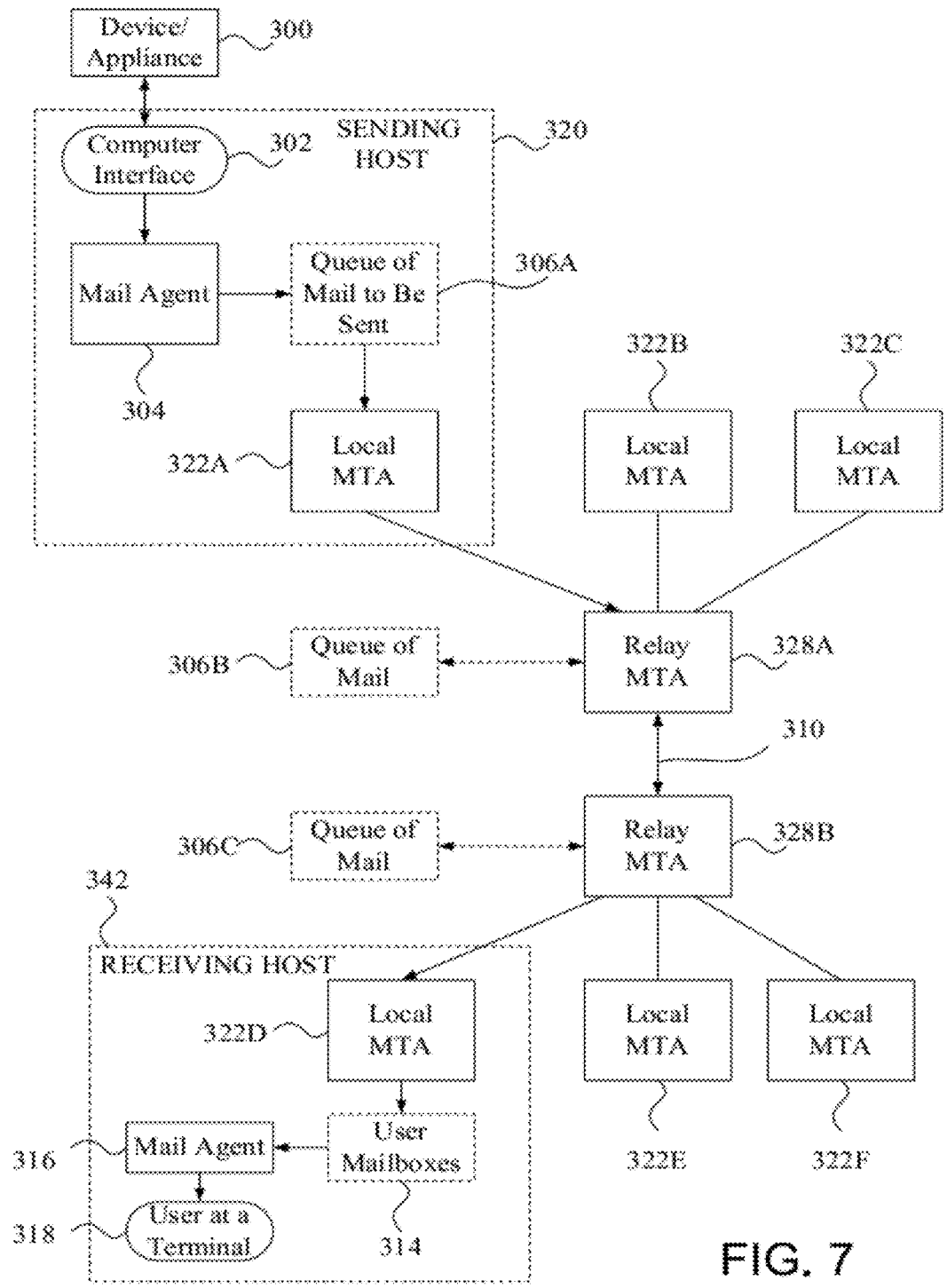
FIG. 7 illustrates an exemplary manner of sending e-mail messages across the Internet.

FIG. 7 illustrates an alternative implementation of transferring mail and is adapted from FIG. 28.3 of "TCP/IP Illustrated Vol. 1" by Stevens referenced previously. FIG. 7 illustrates an electronic mail system having a relay system at each end. The arrangement of FIG. 7 allows one system at an organization to act as a mail hub. In FIG. 7, there are four MTAs connected between two mail agents 304 and 316. These MTAs include local MTA 322A, relay MTA 328A, relay MTA 328B, and local MTA 322D. The most common protocol used for mail messages is SMTP (Simple Mail Transfer Protocol), which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. In another embodiment, the device/appliance 300 and host 320 is in one machine and the host capability is built into the device/appliance 300. Other local MTAs 322B, 322C, 322E and 322F may also be in the other computers or devices/appliances. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 3288 and if desired, stored in a queue of mail 306C. The mail is then forwarded to the local MTA 322D of a receiving host 342. The mail may be placed in one or more of the user mailboxes 314, subsequently forwarded to the mail agent 316, and finally forwarded to the user at a terminal 318. If desired, the mail may be directly forwarded to the terminal without user interaction.

Figure 8:
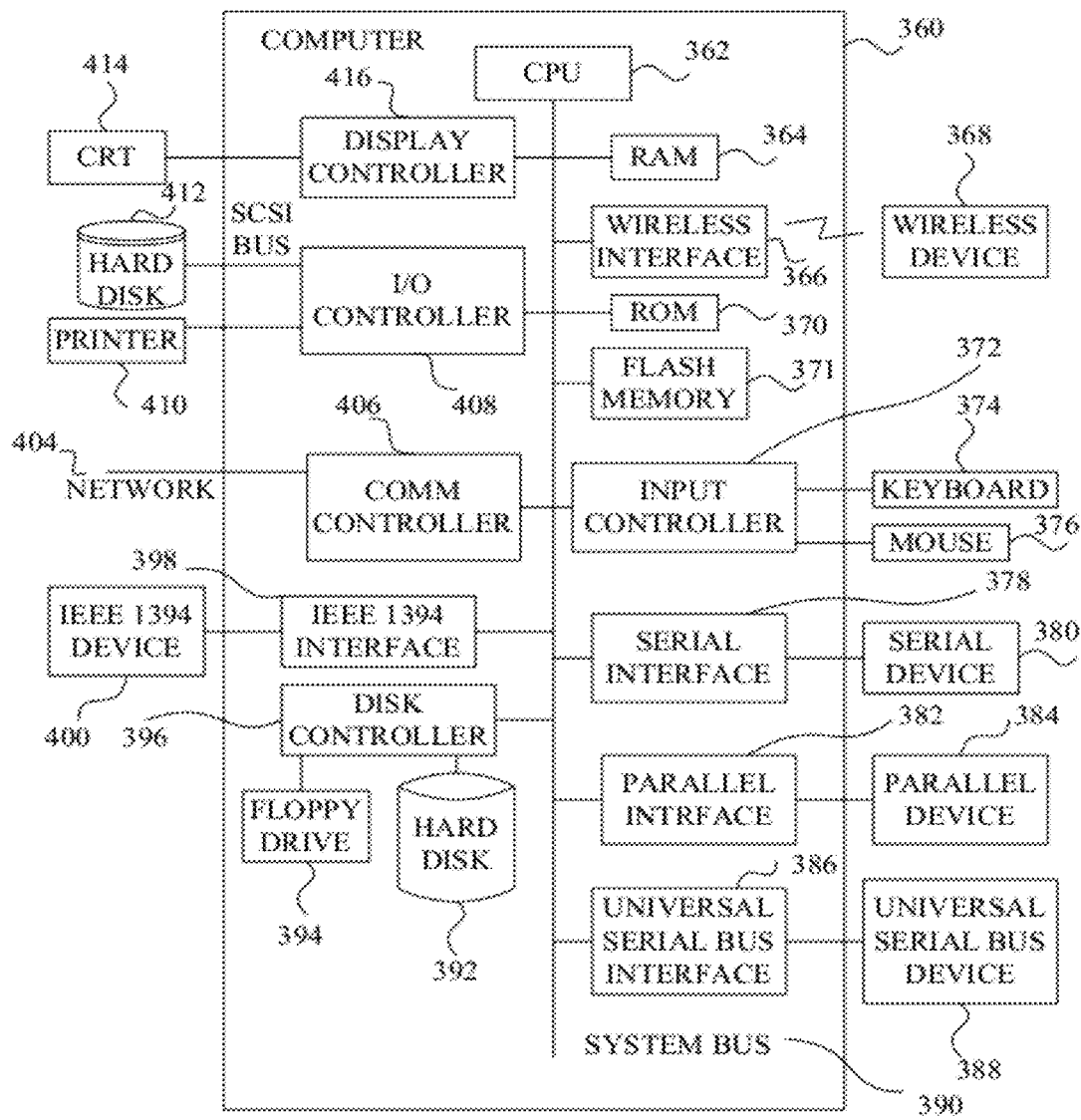
FIG. 8 illustrates an exemplary computer which may be connected to a device/appliance and used to communicate electronic mail messages.

The various computers utilized by the disclosed embodiments, including the computer 266 and 276 of FIG. 5, may be implemented as illustrated in FIG. 8. Further, any other computer or network appliance utilized by this invention may be implemented in a similar manner to the computer illustrated in FIG. 8, if desired, including the server machine 254, computer 272, and computer 282 of FIG. 5. However, not every element illustrated in FIG. 8 is required in each of those computers and/or appliances. In FIG. 8, the computer 360 includes a CPU 362, which may be implemented as any type of processor including commercially available microprocessors from companies such as Intel, AMD, Motorola, Hitachi, IBM and NEC. There is a working memory such as a RAM 364, and a wireless interface 366 which communicates with a wireless devices 368 or wireless network. The communication between the wireless interface 366 and wireless device 368 may use any wireless medium (e.g., radio waves or light waves).

There is a ROM 370 and a flash memory 371, although any other type of non-volatile memory (e.g., EPROM, or an EEPROM) may be utilized in addition to or in place of the flash memory 371. An input controller 372 is connected thereto a keyboard 374 and a mouse 376. There is a serial interface 378 connected to a serial device 380. Additionally, a parallel interface 382 is connected to a parallel device 384, a universal serial bus (USB) interface 386 is connected to USB device 388, and an IEEE 1394 device 400, commonly referred to as a fire wire device, is connected to an IEEE 1394 interface 398. The various elements of the computer 360 are connected by a system bus 390. A disk controller 396 is connected to a floppy disk drive 394 and a hard disk drive 392. A communication controller 400 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to CRT (Cathode Ray Tube) 414, although any type of display may be used including a liquid crystal display (LCD), a light emitted diode display, a plasma display, etc.

Figure 9:
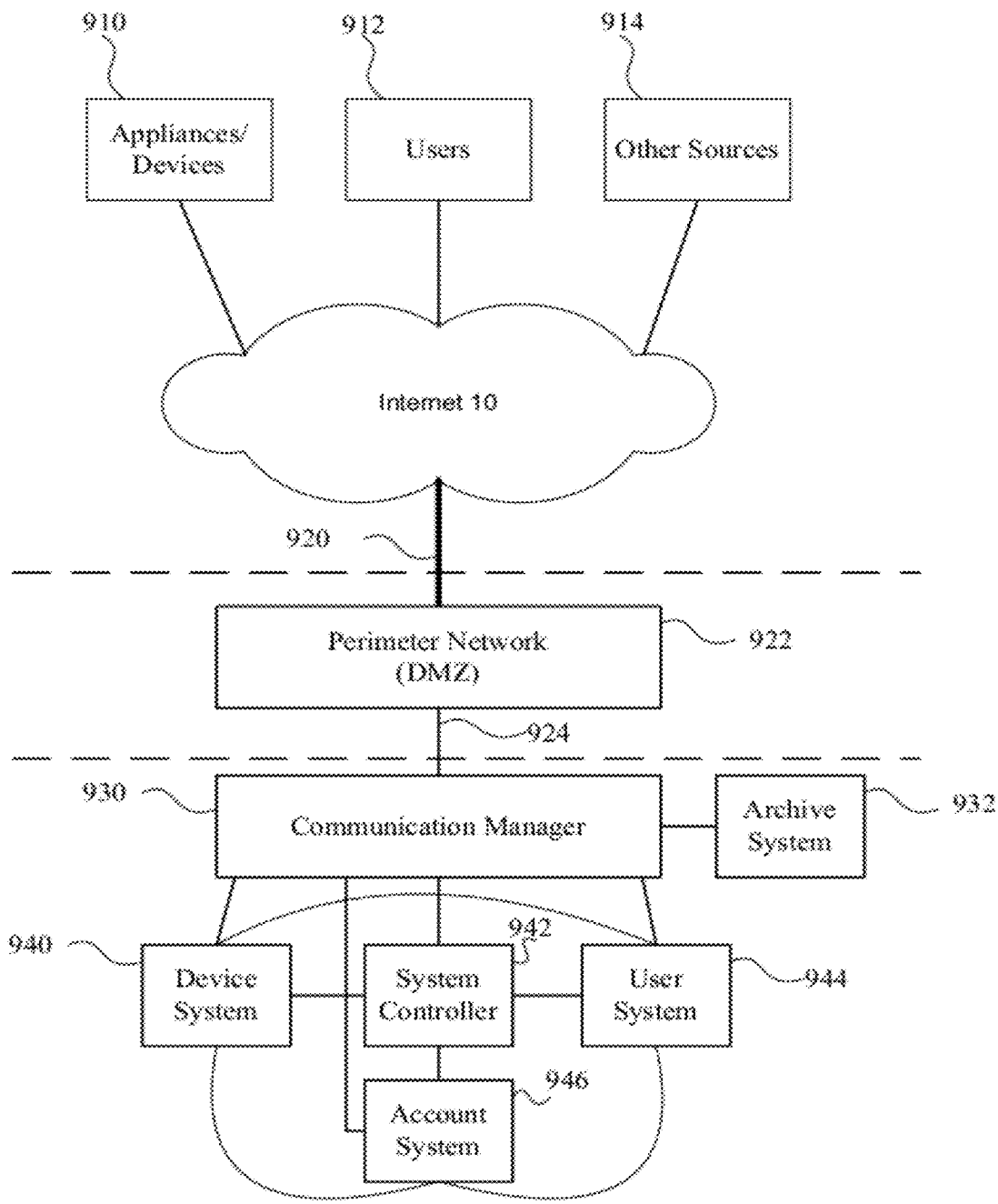
FIG. 9 illustrates an exemplary system configuration in which a remote support system interacts with appliances/devices, users, and other sources and integrates the three component subsystems—Device, User, and Account.

FIG. 9 illustrates an exemplary more detailed block diagram related to 50-1, 260-1, 254 and 256 of FIG. 5, showing the functionality at a service provider. The service provider interacts with the outside through the Internet 10. Appliances/devices 910 send status information, configuration, and alert information. The information may be sent using e-mails or the HTTP protocol. The service provider may send information such as diagnostic inquiry and software updates to the appliances/devices 910. Users 912 send requests such as a help desk service request or information about the devices supported by the contract through the web site. Also, users 912 may receive from the service provider a notification such as order placement or service delivery schedule, the monthly report of the usage of appliances/devices, etc. Other sources 914, such as dealers or independent value added resellers may send an inquiry and report to the service provider. Also, other sources 914 may be an order of supplies and parts not covered by a particular maintenance contract. Perimeter Network 922 secures the internal network of the service provider by connecting Internet 10 to the internal network 924 through the communication link 920. Perimeter Network 922 contains the company's web site, FTP site, and routers, and forms a firewall. A more detailed discussion of firewalls can be found in "Building Internet Firewalls" by D. B. Chapmen and E. D. Zwicky as mentioned before. Although the internal network 924 is shown as one line, in one embodiment, it can be considered as a network (e.g., LAN or WAN).

The communication manager 930 manages incoming and outgoing messages relating to client support. Attached to the communication manager 930 is an archive system 932, where all the incoming and outgoing communications for the client support are compressed and archived for the audit trails or future use. A device system 940 contains the information about the appliances/devices supported. The device system 940 also contains the history information, configuration information, trouble information, service information, and all other information of appliances/devices collected through the current system. The information is tied through the unique identification of the appliances/devices such as serial numbers. By analyzing the data in the device system 940, for example, the user can find which day of the week a particular appliance/device is used most and which day of the month the appliance/device requires a service call. A system controller 942 coordinates the information among the three systems 940, 944, and 946, so that the clients are served optimally. The system controller 942 may utilize the information to construct the context in which a particular request from a user must be handled.

A user system 944 contains the information about all the users who may use the systems. Such users include administrators, key operators, service technicians, sales operator, executives of clients, and the service provider. These users are also tied to their roles to play in the services provided so that right users receive the right information. For example, an executive of a client company will not receive the alert message ("take jammed paper out at paper path A. See the instruction on the front cover.") of a device to be serviced by a key operator. Also, a key operator will not be able to see financial aspects of a contract and aggregated usage information of appliances/devices and service calls. Account system 946 includes multiple subsystems including contracts, pricing, order management, billing, bid management, sales force automation, sales lead, etc. The account system 946 influences the entire processing and defines the business rules. For example, when a bid is pending, the service call processing might get a high priority from the company for demonstration purposes.

The current system of the invention allows a flexible response to the information coming from various sources. For example, when the appliances/devices send alert messages, the responses to the alerts may be different based upon the contract terms with the companies. The same model of printers, for example, may send toner low alerts. If the contract covers the toner, the toner may be delivered to a key operator one day prior to the expected toner out date based upon the historical data of the printer. If the contract does not cover any action to the toner, the key operator may simply get an e-mail about the toner low alert with a link to a toner ordering web site.

Figure 10:
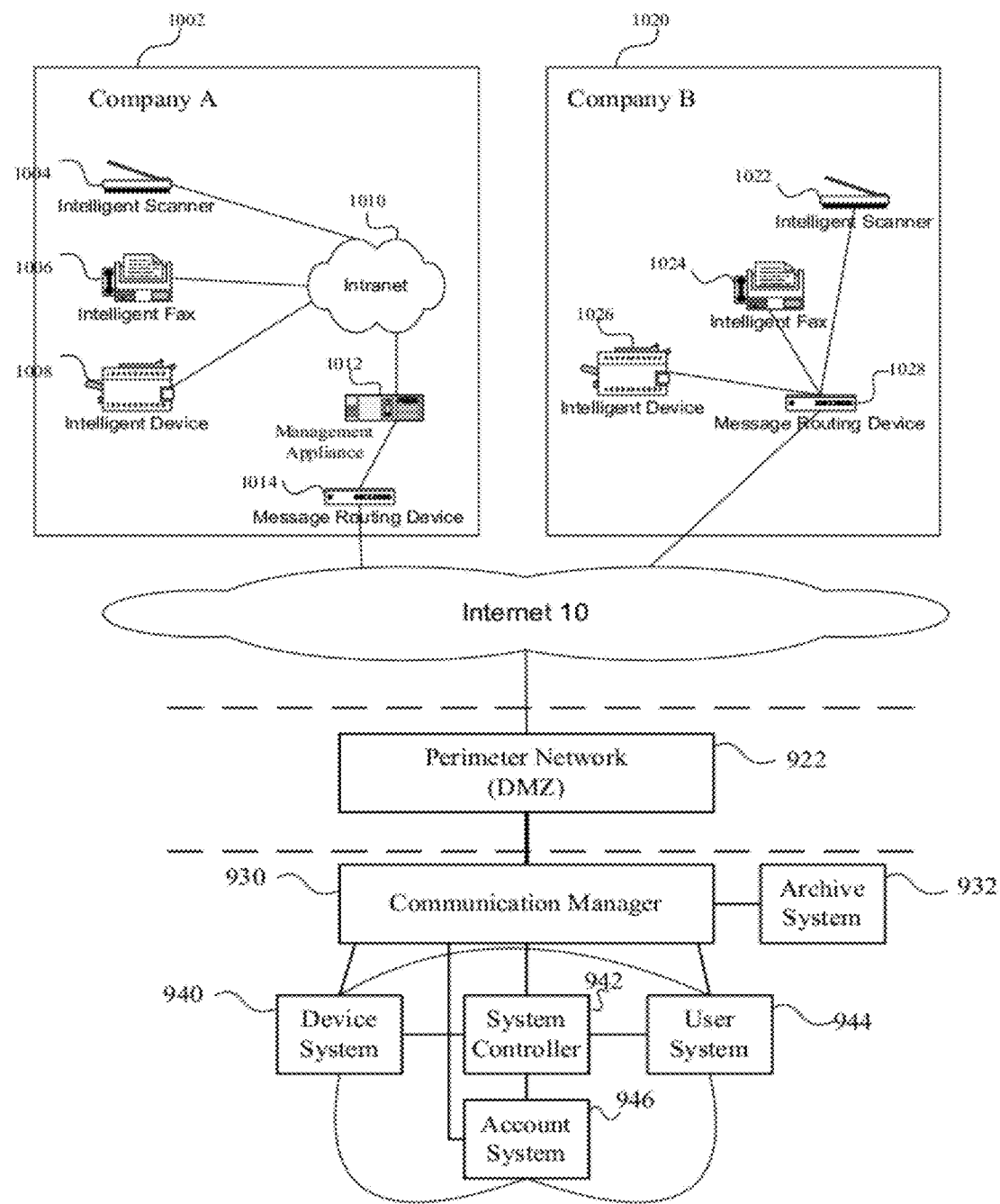
FIG. 10 illustrates exemplary device/appliance information interacting with a remote support system.

FIG. 10 illustrates two different exemplary methods to collect various information from business office appliances/devices. In Company A, business office appliances/devices 1004, 1006, and 1008 are connected to Intranet 1010 and are monitored by a management appliance 1012. The data collected by this management appliance 1012 includes, but is not limited to, configuration, alerts, warning, and quantitative data such as print counts and the amount of toner remaining. The management appliance 1012 sends and receives messages to and from the service provider periodically. Such messages can be e-mails or through the HTTP protocol. Message routing device 1014 routes the messages from the management appliance 1012 to the Internet 10. Although message routing devices 1014 and 1028 are depicted as one device, they can be multiple devices, such as computers, routers, and switches connected through the Intranet or WAN. When the management appliance 1012 receives messages from the service provider, the messages may be parsed and, if action from an appliance/device is needed, the management appliance 1012 sends an appropriate control command. Examples of such actions may be software updates, diagnostic commands, and a process parameter adjustment. In the case of Company B, business office appliances/devices 1022, 1024, and 1026 send and receive messages to and from the service provider periodically through a message routing device 1028. Although not shown, the access to the Internet 10 usually involves a firewall to prevent unwanted access to the internal network. All the messages regarding the appliances/devices are associated with unique identifications, such as serial numbers, so that the appliances/devices can be easily identified.

Figure 11:
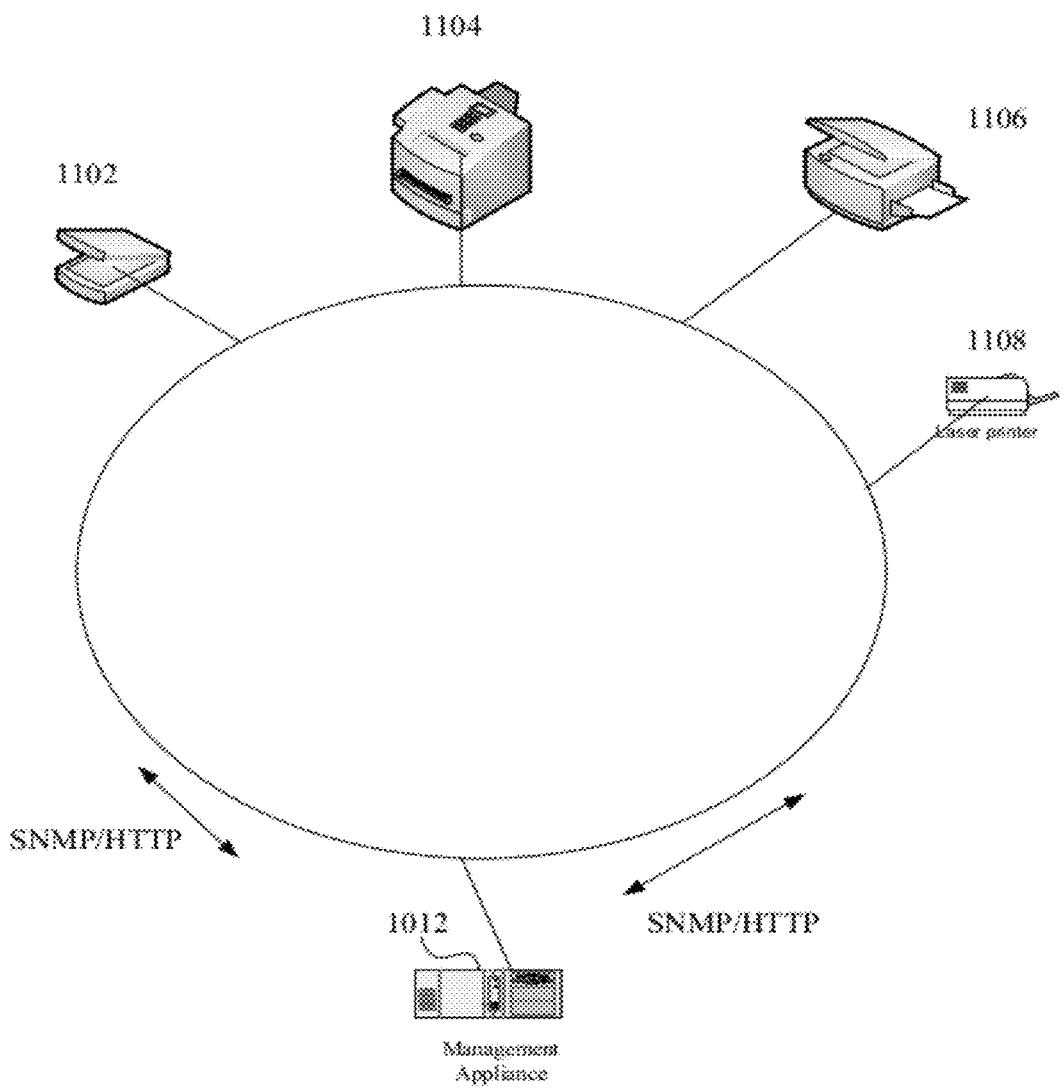
FIG. 11 illustrates an exemplary management appliance that monitors devices on a network.

FIG. 11 illustrates an exemplary environment in which the exemplary embodiments operate. In the exemplary environment, it is assumed that the private MIBs of one or more vendors cannot be used, are not available, or do not include enough information to determine one or more parameters of interest. As illustrated in FIG. 11, the management appliance 1012 may be able to communicate with a scanner 1012, multi-function machine 1104, digital copier 1106, and/or laser printer 1108 via SNMP and HTTP. The management appliance 1012 implements an embodiment in which newer devices are analyzed and added to a list of known or existing devices, automatically. For example, a device 1108 is a newer model of a laser printer with various information structures that are different from an older model of the laser printer that is monitored by the management appliance 1012. Accordingly, a previously known method to extract information from the older model of the laser printer may no longer be valid in this situation. If the previously known method can be used, it can be imported to the extraction method for the new device 1108. If not, a new extraction method to obtain the device information must be automatically generated and added to the management appliance 1012.

Figure 12A:
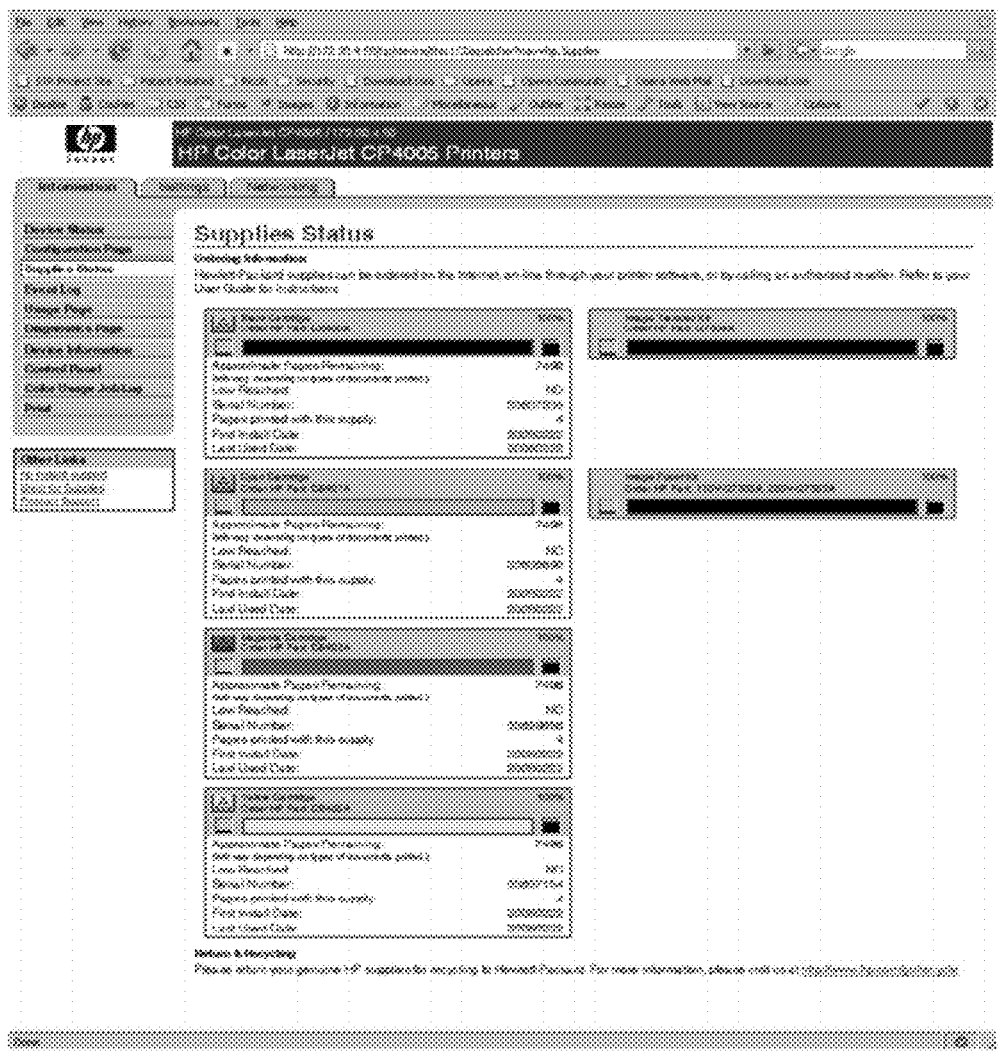

FIGS. 12A to 12D illustrate examples of information that can be obtained using HTTP/HTML and SNMP, respectively. The information in these examples relate to the status of printer supplies (e.g., toner levels). SNMP information is obtained using the standard printer MIB, such as the printer MIB v2 defined in RFC 3805, or the printer MIB v1 defined in RFC 1759, both of which are incorporated herein by reference. As illustrated in FIG. 12B, the first 6 lines of the SNMP information indicate the maximum capacity of each of the various toners, while the last 6 lines indicate the current toner level of each of the various toners. In some cases the first 6 lines of the SNMP information, indicating the maximum toner level capacities, may be missing. In such a case, the system is unable to determine what the value of 7500 means for the toner level. However, by using HTTP/HTML, information, the system can determine that 7500 should be used as the denominator to compute/interpret the remaining toner level.

FIGS. 12C and 12D illustrate additional examples of information that can be obtained using SNMP. As illustrated in FIG. 12C, in one embodiment, the SNMP information also contains the description of the entries, such as Magenta Cartridge HP CB403A and Image Transfer Kit HP Q7504A. FIG. 12D illustrates an example in which invalid values are returned via SNMP.

For example, in FIG. 12A, the Web display (HTML website) shows 100%, while the maximum toner capacity of 7500 and toner supply level of 7500 can be obtained from the SNMP information for the corresponding toner. Therefore, Toner Supply Level/Maximum Toner Capacity X 100 is the percentage shown in the Web display (HTML website). This formula can be used to verify the SNMP information regarding the maximum toner capacity and toner supply level or to determine the maximum capacities of the toners, when information on the maximum capacities of the toners cannot be obtained using SNMP. The steps described here illustrate an exemplary method of how to supplement SNMP information with HTTP/HTML information.

Figure 13:
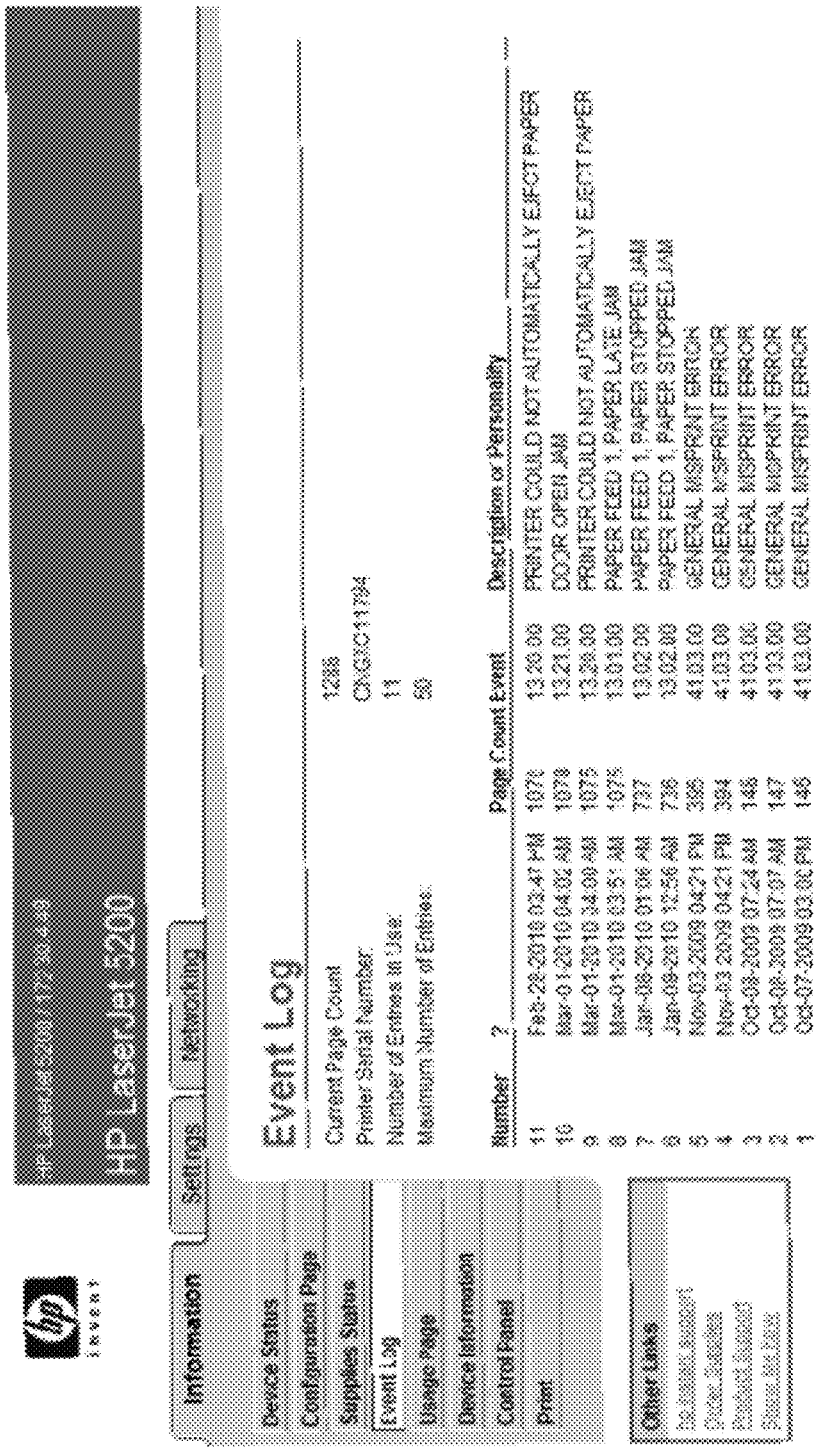
FIG. 13 illustrates an example of an event log obtained through HTTP/HTML.

FIG. 13 illustrates an exemplary event log obtained using HTTP/HTML. Usually, the event log shows a history of abnormal events. This list of events cannot be obtained using SNMP, through the standard printer MIB. Therefore, obtaining the event log must be performed using HTTP/HTML. In addition, some models from the same vendor may not support the event log either. Therefore, when a new device is attached from a known vendor, the new device must be examined to see if the event log can be obtained. For example, this device does not support the job history shown in FIG. 14.

Figure 14:
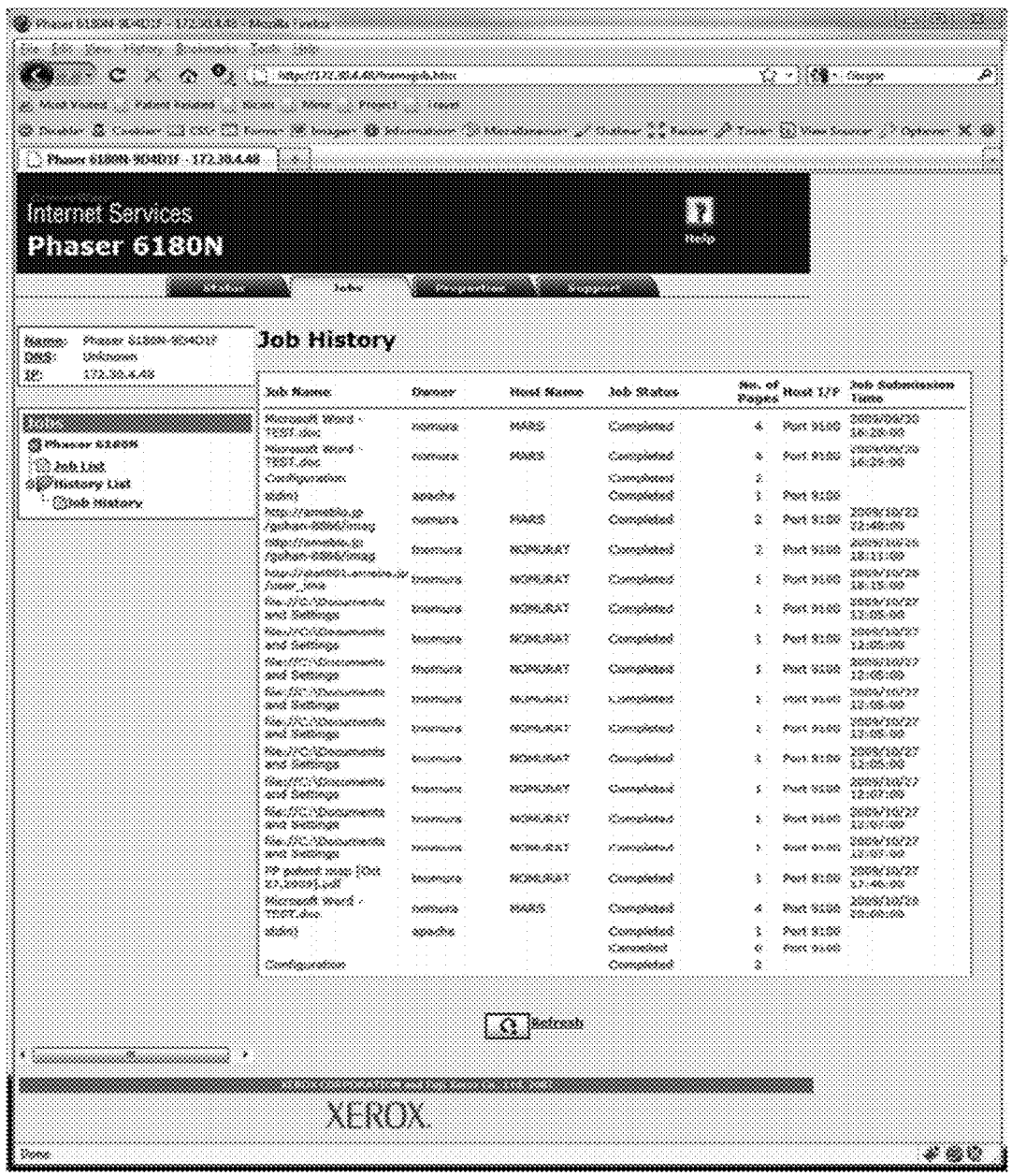
FIG. 14 illustrates an example of a job history handled by a printer and obtained through HTTP/HTML.

FIG. 14 illustrates an exemplary detailed print job history obtained using HTTP/HTML. Based upon this information, it is possible to charge the account of a person who printed a particular print job. As discussed above, this information may not be available from all printers. Therefore, the management appliance 1012 must recognize what kind of information can be obtained from a newly attached device.

Figure 15:
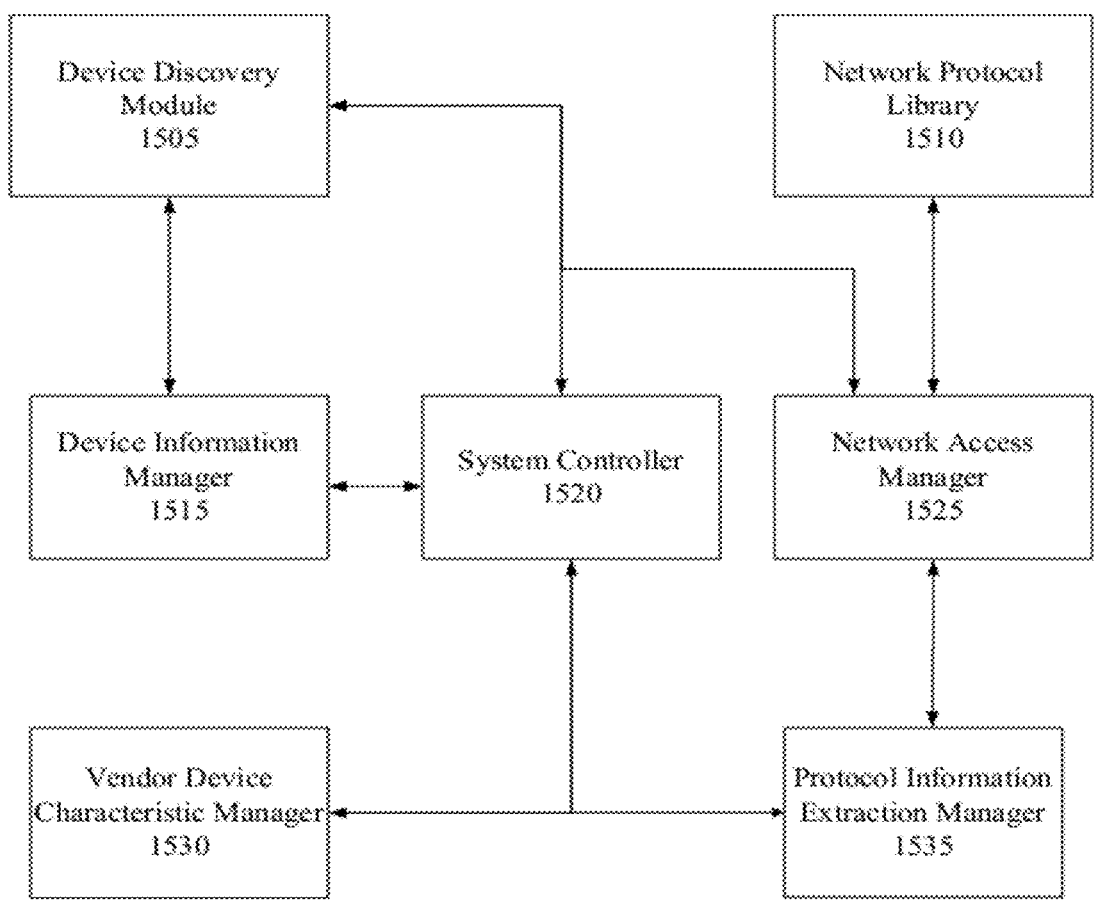
FIG. 15 illustrates an exemplary software block diagram to handle a monitoring task along with the addition of new devices.

FIG. 15 illustrates an exemplary software block of the management appliance 1012. The arrows indicate the command/data flow among the software blocks. Based upon the Unified Modeling Language (UML), a software block may be referred to as a package. Therefore, in this specification, the terms software block and package are used interchangeably. In the management appliance 1012, a device discovery module 1505 discovers devices of interest such as printers and multi-function (MF) devices. The device discovery module 1505 may also sweep the network to discover any newly attached devices on the network. Methods of discovering devices connected to a network are well known and have been implemented by many printer vendors such as Ricoh, HP, Xerox, Lexmark, etc. The management appliance 1012 also includes a network protocol library 1510, which contains a library of programs corresponding to various protocols to ease programming. In one embodiment, the network protocol library 1510 includes programs for the HTTP protocol, SNMP protocol, and error handling. For example, Java language has a library to support HTTP and HTML, and snmp4j is a public domain library of Java for SNMP. Accordingly, these libraries are included in the network protocol library 1510, in one embodiment.

Figure 20:
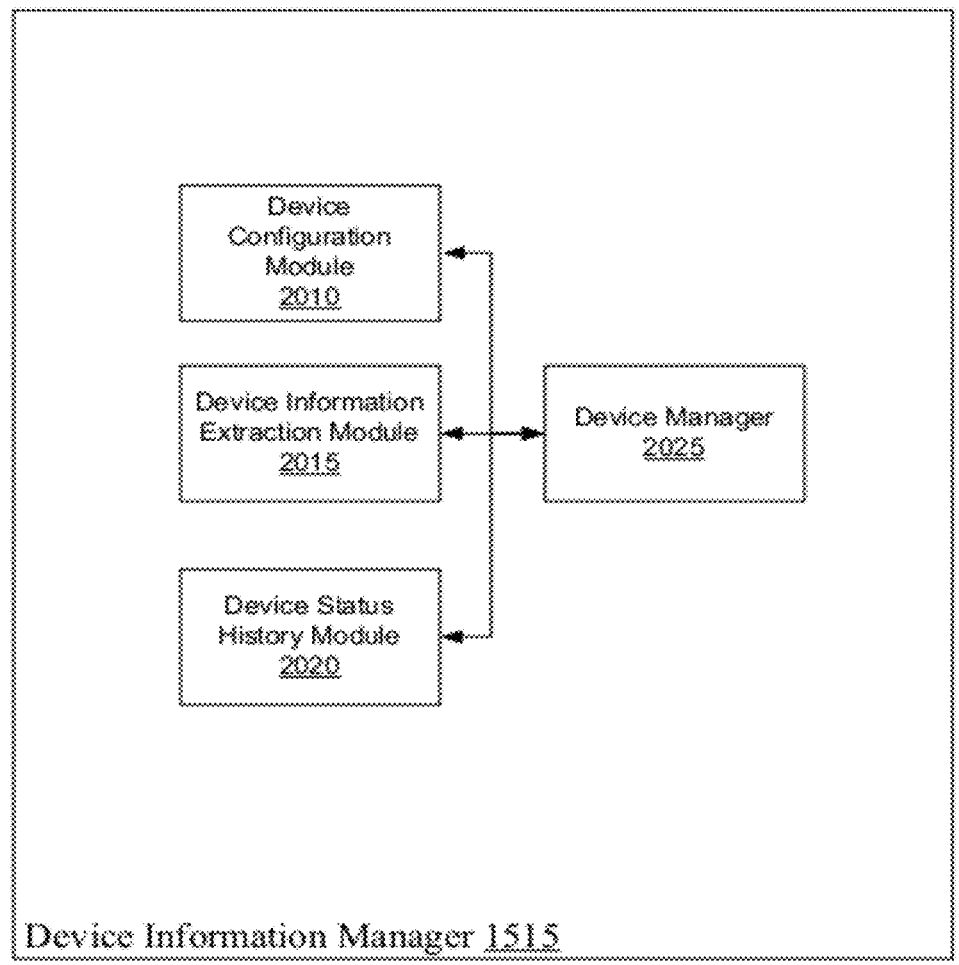
FIG. 20 illustrates and exemplary software block diagram of a Device Information Manager.

A device information manager 1515 includes various information areas of the devices and is described in further detail in the discussion of FIG. 20. The device information includes (but is not limited to) network address, serial number, vendor, and model name. In addition, historical data (e.g., a history of status information) may be stored in a database. A system controller 1520 handles the overall operation of the management appliance 1012. A network access manager 1525 implements the various protocols and network access to obtain the necessary information (i.e., information of interest) from a device over the network. A vendor device characteristic manager 1530 contains vendor specific information. The vendor specific information includes, for example, one or various web page URL's for known models, particular information regarding how to extract information from the various web pages, private MIB if available, how to interpret values, etc. Vendor specific information is further described in U.S. Pat. No. 7,664,886, which has been incorporated by reference as noted above.

U.S. Pat. No. 7,664,886 also discusses exemplary methods that can be used to extract information of interest from a device using HTTP/HTML. In one embodiment, a protocol information extraction manager 1535 extracts information from the device obtained through the network access manager 1525 using the vendor device characteristic manager 1530 or device information manager 1515, if the device is known. However, if unknown device information is received, the protocol information extraction manager 1535 will use its own information, described in FIG. 19, to generate a method to extract information of interest and to store the information of the extraction method into the vendor device characteristic manager 1530 and to store a reference to the same extraction method into the device information manager 1515.

Figure 16:
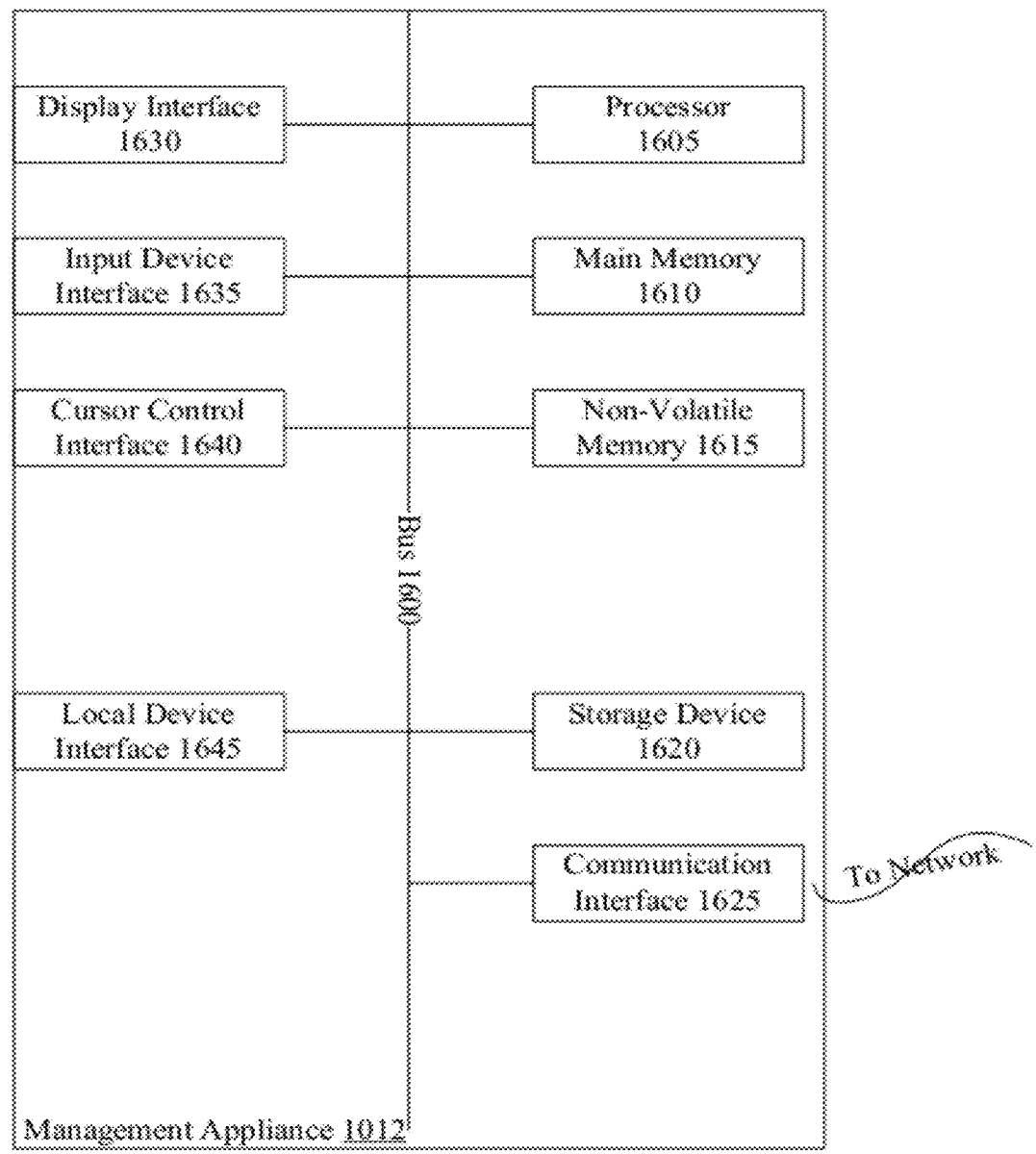
FIG. 16 illustrates an exemplary hardware block of a management appliance.

FIG. 16 illustrates an exemplary block diagram of the management appliance 1012, in which embodiments of the invention can be implemented. In one embodiment, the management appliance 1012 illustrates a non-limiting example of a system configuration of the office appliance 27 (illustrated in FIG. 1). The management appliance 1012 includes a bus 1600 or other communication mechanism for communicating information and connecting components of the management appliance 1012. The management appliance 1012 further includes a processor 1605 coupled with the bus 1600 for processing information. The management appliance 1012 also includes a main memory 1610, such as a random access memory (RAM) or other dynamic storage device, coupled to the bus 1600 for storing information and instructions to be executed by the processor 1605. The main memory 1610 may also be used for storing temporary variables or other intermediate information during the execution of the instructions by the processor 1605. A non-volatile memory 1615, such as a read only memory (ROM), flash memory, or other static storage device, is coupled to the bus 1600 for storing static and semi-static information and instructions for the processor 1605. A storage device 1620, such as a magnetic disk, optical disk, magneto-optical disk, or solid state drive (SSD), is provided and coupled to the bus 1600 for storing information and instructions. The management appliance 1012 also includes a communication interface 1625 that is connected to the bus 1600 and the network, to allow the management appliance 1012 to communicate with and monitor network devices. The management appliance 1012 may be coupled via the bus 1600 to a display, through a display interface 1630 that is coupled to the bus 1600, for displaying information to a user or to a maintenance person. An input device such as a keyboard may be connected through an input device interface 1635, which is coupled to the bus 1600. Another type of user input device is a cursor controller such as a mouse, a trackball, or cursor direction keys that is attached to a cursor control interface 1640 for communicating direction information and command selections to the processor 1605 via the bus 1600, and for controlling cursor movement on the display. Local devices such as a printer or memory card may be attached to the management appliance 1012 though a local device interface 1645 coupled to the bus 1600. Examples of the local device interface 1645 include, but are not limited to, a universal serial bus (USB), RS-232, IEEE 1394, etc.

Figure 17:
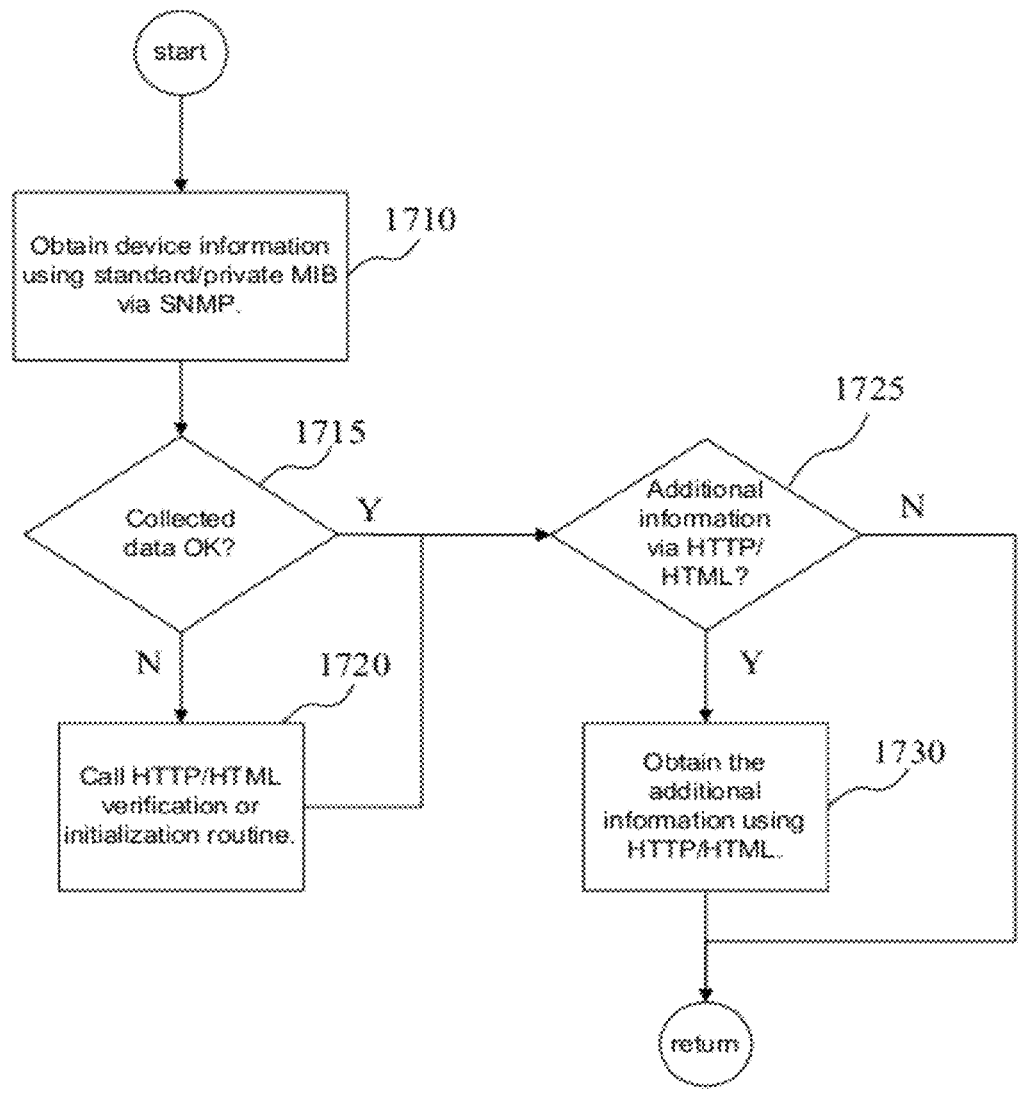
FIG. 17 illustrates an exemplary overall flow diagram of the system to obtain information from devices on the network.

FIG. 17 illustrates an exemplary flow diagram of a method for collecting information from a device that is already known to the management appliance 1012. In step 1710, device information is collected from the device using one or more standard and/or private MIBs via SNMP. The device information includes status information (i.e., non-configuration device information) and/or device configuration information. Examples of status information include toner level, page count of print jobs, whether the print jobs were color or monochrome, etc. Examples of device configuration information include serial number, vendor information, model information, information on any attachments, memory size, hard disk information, etc.

In one embodiment, the management appliance 1012 collects the device information by transmitting one or more SNMP commands to the device's IP address stored in a device configuration module 2010 of the device information manager 1515. The device configuration module 2010 contains IP addresses of one or more devices to be monitored by the management appliance 1012. The IP addresses may be obtained by a device discovery module 1505. However, the IP addresses may be obtained by other methods, such as registration by a user. Once a first contact is established during the device discovery period, the device configuration module 2010 is filled with various device configuration information, such as one or a combination of the examples of configuration information discussed above, using the initialization routine shown in FIG. 18A, as an example.

After obtaining the device information in step 1710, through the protocol information extraction manager 1535, using information stored in the device information extraction module 2015, a determination of whether the collected device information is OK is made in step 1715. In an exemplary embodiment, in step 1715, the determination of whether the collected data is OK is based on one or a combination of whether a device change is detected from the collected device information, whether collection of any device information has failed, and whether additional information is necessary to interpret the collected device information. A conflict is detected when one or more of the collected data is determined not to be OK, at which time the process proceeds to step 1720.

For example, the management appliance 1012 will detect a conflict in the collected data when a device identifier obtained in step 1710 for a particular IP address is different from an expected device identifier (i.e., a previously acquired device identifier), which indicates that the device has been changed (i.e., the device has been replaced with a different device). In another example, a conflict is detected when the transmission of device information fails due to a transmission error caused by, for example, invalid SNMP information requests resulting from a change in devices, or a transmission error due to dropped packets when using, for example, the user datagram protocol (UDP).

A conflict may also be detected when additional information is necessary to interpret collected device information and a reference value necessary to interpret the status information could not be collected using SNMP. For example, if collected status information includes a value (e.g., supply level of toner) that is relative to a reference value (e.g., maximum toner capacity), the collection of the relative value alone would not be sufficient to determine a percentage of toner remaining. In this example, the reference value of the maximum toner capacity is necessary to interpret the value of the supply level of toner. Depending on the embodiment, the reference value may be retrieved each time the relative value is collected, at predetermined intervals, or based on a predetermined event (e.g., toner replacement).

Accordingly, in one embodiment, the system determines whether collected data is OK based on whether the collected device information includes fixed or relative values. When the collected data is determined to include a relative value, the system further determines whether a reference value corresponding to the relative value is included in the collected device information, or has previously been determined/collected. In one embodiment, the collected data is determined to be OK when the reference value corresponding to the relative value is included in the collected data or has previously been determined/collected.

Figure 18A:
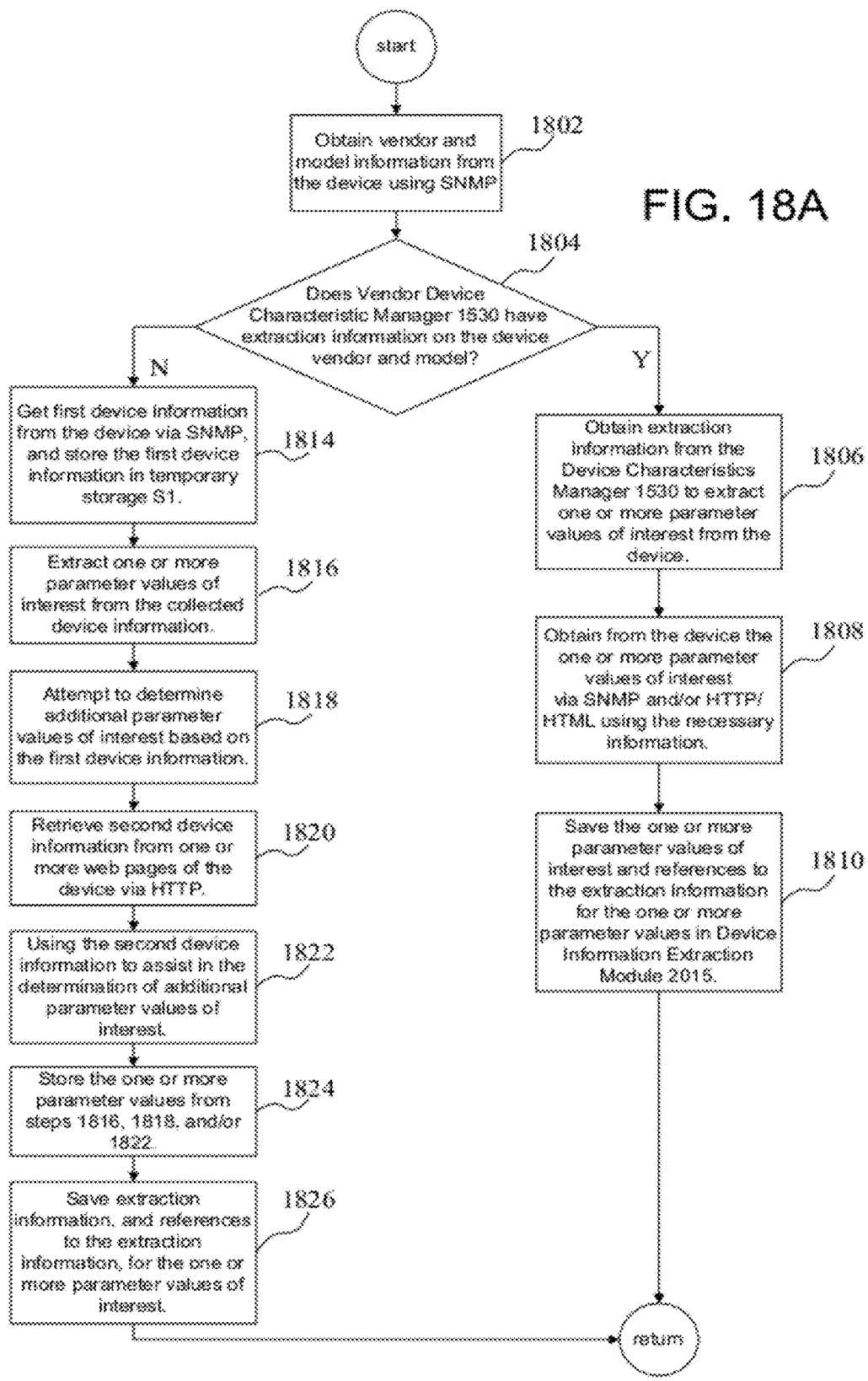
FIGS. 18A and 18B show exemplary detailed flow diagrams of the remote support system when it encounters a new device.

As noted above, the process performed in step 1720 varies based on the type of conflict. In one embodiment, when the conflict is the result of a device change, the initialization routine of FIG. 18A is called. However, when the conflict is the result of missing information due to a transmission error resulting from dropped packets or additional information being required to interpret collected device information, the missing information is acquired from the network device using HTTP/HTML. In another embodiment, the initialization routine of FIG. 18A is called for any type of conflict.

If the routine of FIG. 18 is run, the SNMP information are collected again. Afterwards, some of the data is converted to one or more standard formats. For example, the maximum toner capacity 7500 and supply level of magenta 7500 are converted to a data structure with magenta and 100. At step 1715, the system checks to see if all the collected data is OK. The determination of whether the collected data is OK is based on whether the system has enough information to interpret the collected data. For example, if the collected data includes a value (e.g., supply level of toner) that is relative to a reference value (e.g., maximum toner capacity), the collection of the relative value alone would not be sufficient to determine a percentage of toner remaining. Accordingly, in one embodiment, the system determines whether the collected data are OK based on whether the collected data include fixed or relative values. When the collected data is determined to include a relative value, the system further determines whether a reference value corresponding to the relative value is included in the collected data. In one embodiment, the collected data is determined to be OK when the reference value corresponding to the relative value is included in the collected data.

In addition, if the device was connected to the network recently, step 1715 returns N for a first predetermined number of accesses to the device (e.g., the first 20 accesses). By repeating the HTTP/HTML verification of step 1720 for the first predetermined number of accesses to the device, the system is able to confirm the validity of collected values and whether relative values are being properly interpreted. In one embodiment, the system confirms the validity of values collected via SNMP based on device information collected via HTTP/HTML. Data collected from the device judged to be OK are stored in a device status history module 2020. If all the collected data is determined to be OK, the routine proceeds to step 1725. For the data collected from the device and judged not to be OK, at step 1720, a verification routine to use HTTP/HTML information is executed in order to acquire missing data (e.g., a reference value or a valid value), and the missing data is saved in the device status history module 2020.

Further, by repeating the HTTP/HTML verification of step 1720, the system is able to attempt to determine additional parameter values of interest from the SNMP information over a period of time. For example, certain color printers (e.g., manufactured by Oki) return maximum and current toner levels via SNMP. However, SNMP fails to indicate the colors corresponding to those toner levels. Even though the colors and corresponding percentages of toner remaining may be available via HTTP/HTML, the initial percentages of toner remaining for all the colors would likely be 100%. Therefore, the system would be unable to distinguish between the different colors corresponding to the SNMP toner levels using the HTTP/HTML information. However, over time, as the color printers are used, each of the Y, M, C, and K colors will have different values such as 80%, 95%, 99%, and 90%. At this time, the four remaining percentages of toner can be computed from the SNMP toner levels and the corresponding colors determined, based on a comparison with the HTTP/HTML information on percentages of toner remaining.

For example, when a newly acquired toner level value is invalid (e.g., negative), a corresponding toner level value obtained by HTTP/HTML is examined. If the obtained value from HTTP/HTML is consistent with the historical toner level data, the value from HTTP/HTML is used for the current toner level. For example, the obtained value from HTTP/HTML is determined to be inconsistent when a current toner level is determined to be higher than a previously obtained toner value. The value is determined to be inconsistent in this example, since toner levels are expected to decrease, not increase, over time. When the obtained value is determined to be inconsistent, a recovery process is performed using SNMP and/or HTTP/HTML. The step 1720 is executed by the protocol information extraction manager 1535 using information in the device information extraction module 2015. Then, in step 1725, the process goes to check if additional information (e.g., event log or job history) needs to be collected based upon the information in the device configuration module 2010. For example, the device configuration module 2010 may contain the reference to the extraction method to obtain the event log and/or job history as shown in FIGS. 13 and 14. If no more information is needed, the process ends. If additional information is needed, the additional information is collected via HTTP/HTML in step 1730, using the protocol information extraction manager 1535, based upon the referenced extraction information of the device information extraction manager 2015.

FIG. 18A illustrates an exemplary initialization routine for obtaining information from a device, when the device is encountered for the first time. In one embodiment, the device discovery module 1505, illustrated in FIG. 15, is likely to call this process. However, step 1710 may call this process when the device configuration module 2010 does not have enough information, except for an IP address, or has a conflict with the collected data from the device, as discussed above.

In step 1802, vendor and device model information are collected from the device through SNMP. The vendor and device model information may be collected from the device through SNMP, using the methods described in the applications listed in the cross-reference to related applications section. After identifying the vendor and model, they are converted to normalized names, as further discussed in the above referenced applications. In step 1804, the vendor name is used to determine if the vendor device characteristic manager 1530 contains any information regarding the specified model.

When the vendor device characteristic manager 1530 contains the information regarding the model, the process proceeds to steps 1806 and 1808, at which time one or more parameter values of interest are obtained and stored in the device configuration module 2010. Step 1806 obtains extraction information from the vendor device characteristic manager 1530 and step 1808 uses the extraction information to determine the one or more parameters of interest. In addition, in step 1810, the one or more parameter values of interest and a reference to the extraction information for determining each of the one or more parameter values of interest is saved in the device information extraction 2015 in association with an IP address or other information identifying the device such as device ID.

In one embodiment, the extraction information defines a method for extracting information necessary to determine a parameter value of interest and, if necessary, information on how to determine the parameter value of interest from the extracted device information. The necessary information may correspond to the parameter value of interest itself or one or more values that may be used to calculate the parameter value of interest. The extraction method defines one or more communication protocols (e.g., SNMP or HTTP/HTML) that should be used to extract the necessary information and information on how the necessary information is to be extracted using the defined one or more communication protocols. Due to the quicker retrieval times of SNMP, the extraction method typically defines SNMP as the communication protocol to be used for extraction, when possible.

An example of the information on how to determine the parameter value of interest relates to the computation of a percentage of toner remaining. For some devices, two toner information for prtMakerSuppliesLevel and prtMarkerSuppliesMaxCapacity must be obtained to compute the remaining toner percentage. In this example, the extraction method defines the manner in which the prtMakerSuppliesLevel is to be extracted, and the information on how to determine the parameter value of interest from the extracted device information includes the prtMarkerSuppliesMaxCapacity or information defining how to obtain the prtMarkerSuppliesMaxCapacity. For other devices, the prtMarkerSuppliesLevel may be sufficient to obtain the remaining toner percentage because the prtMarkerSuppliesMaxCapacity is 100. In this example, information on how to determine the parameter value of interest from the extracted device information indicates that the prtMakerSuppliesLevel itself is sufficient. Alternatively, the information on how to determine the parameter value of interest may be omitted. Thus, there are different ways to compute the remaining toner in different devices.

If at the step 1804, the vendor device characteristic manager 1530 did not have the information about the vendor and model of the device, the system proceeds to step 1814 to collect first device information via SNMP and stores the collected first device information in a temporary storage S1. In one embodiment, the collected first device information includes all the information available from the device using one or more standard MIBs of SNMP. In another embodiment, the collected first device information only includes a subset of the information available from the device using the one or more standard MIBs of SNMP. In a further embodiment, the collected first device information also includes some or all information from one or more private MIBs. The temporary storage S1 stores the first device information as a data set that will be used to determine one or more parameter values of interest. The one or more parameter values of interest are determined based on the identification of the parameter value of interest in the data set or by calculating the parameter value of interest based on the information included in the data set.

In step 1816, standard SNMP values are extracted from the collected first device information using, for example, the SNMP standard and corresponding words table 1905. For example, the collected SNMP information is processed to identify keywords stored in the SNMP standard and corresponding words table 1905 to identify one or more particular parameters of interest. Alternatively, the SNMP values can be extracted directly from the device. Further, in step 1818, the system attempts to determine additional parameter values of interest based on the first device information. The additional parameter values of interest include predetermined parameter values of interest that could not be extracted in step 1816. For example, when the supply level of toner and maximum toner capacity are included in the first device information, in step 1818, the management device attempts to determine a percentage of toner remaining by dividing the supply level of toner by the maximum toner capacity.

Afterwards, second device information is retrieved from one or more web pages (e.g., HTML web pages) obtained via HTTP, in step 1820. In step 1822, the second device information is used to assist in the determination of additional parameter values of interest. Specifically, in one embodiment, the second device information is used to verify a parameter of interest extracted in step 1816, an additional parameter value of interest determined in step 1818, and/or to assist in the determination of an additional parameter value of interest that could not be determined from the first device information alone, for example, in steps 1816 and 1818.

For example, the second device information can be used in step 1824 to determine a method of determining a supply level of toner for a particular color from the first device information, when the first device information includes the supply levels of the different color toners, but does not identify the colors corresponding to the supply levels. The one or more of the colors corresponding to the toner supply levels can be determined based on a comparison between supply level related information included in the first and second device information. The system can compare the supply level of toner values obtained using SNMP with the percentage of toner remaining or approximate pages remaining, as illustrated in FIG. 12A, to attempt to identify the corresponding colors for the supply levels in the first device information. If the corresponding colors cannot be determined because, for example, all the toner supply levels are the same, this determination is performed again at a later date, when the there is a sufficient difference between the toner supply levels to determine one or more of the corresponding colors. In another example, the second device information is used to determine a percentage of toner remaining, when the first device information only includes the supply level of toner and does not include the maximum toner capacity, which is necessary to compute the percentage of toner remaining.

In one embodiment, all the web pages from the device are acquired in step 1820 by accessing the IP address of the device. However, only a subset of the web pages from the device may be acquired in other embodiments. The web pages are analyzed to identify information of interest in step 1820. The information of interest may correspond to a parameter value of interest or information necessary to determine the parameter value of interest. In one embodiment, the acquired web pages are processed using a SNMP standard and corresponding words table 1905 and/or an additional information words table 1910. The tables 1905 and 1910 contain keywords to assist in the identification of parameter values of interest and/or information necessary to determine one or more parameter values of interest. The main processing of the HTTP/HTML pages is performed by the protocol information extraction manager 1535.

Further, in step 1822, the parameter values of interest and/or information necessary to determine one or more parameter values of interest identified in step 1822, are used to assist in the determination of additional parameter values of interest from the first device information collected via SNMP in step 1814. Further, the parameter values of interest and/or information necessary to determine one or more parameter values of interest identified in step 1822 may be used to determine the additional parameter values of interest independent of the first device information. In the exemplary embodiment, collection of the one or more parameter values of interest via SNMP is preferred due to the reduced processing and time requirements to collect data using SNMP. Accordingly, when a parameter value of interest could not be determined in step 1816, but could be determined in step 1822, the system attempts to identify information necessary to determine the parameter of value of interest in the first device information obtained via SNMP, based on the determination in step 1822. In one embodiment, this attempted identification is repeatedly performed over a period of time to confirm that the necessary information has been identified. If the necessary information can be identified in the SNMP information, the extraction method for the parameter value of interest using SNMP is stored in step 1826, as further discussed below.

In step 1824, the one or more parameter values of interest determined in steps 1816, 1818, and/or 1822 are stored. However, the disclosed embodiments are not so limited, and storage of the device information via SNMP and HTTP/HTML may occur at the time of, or any time after, extraction of the parameter values of interest.

Further, in step 1826, extraction information defining one or more methods for extracting information necessary to determine the one or more parameter values of interest and, if necessary, information on how to determine the one or more parameter values of interest using the necessary information, are determined and stored. For example, when the information of interest extracted in step 1820 is needed to assist in the determination of a parameter value of interest in step 1822, the information of interest extracted in step 1820 itself, or information on how to extract the same, is included in the extraction information stored in step 1826. Alternatively, extraction information may be stored in the vendor device characteristic manager 1530 each time a parameter value of interest is determined, or any time thereafter. Further, a reference to the extraction information is also saved in the device information extraction module 2015, in step 1826.

The vendor device characteristic manager 1530 stores the extraction information for particular vendors and models, while the device information manager 1515 stores the device information along with references to the extraction information. The device information manager 1515 only stores the references to the extraction information, in one embodiment, in order to avoid duplication. However, the disclosed embodiments are not so limited, and the device information manager 1515 stores the extraction information itself rather than the reference to the extraction information in other embodiments. Then, the process returns to the calling function.

Figure 18B:
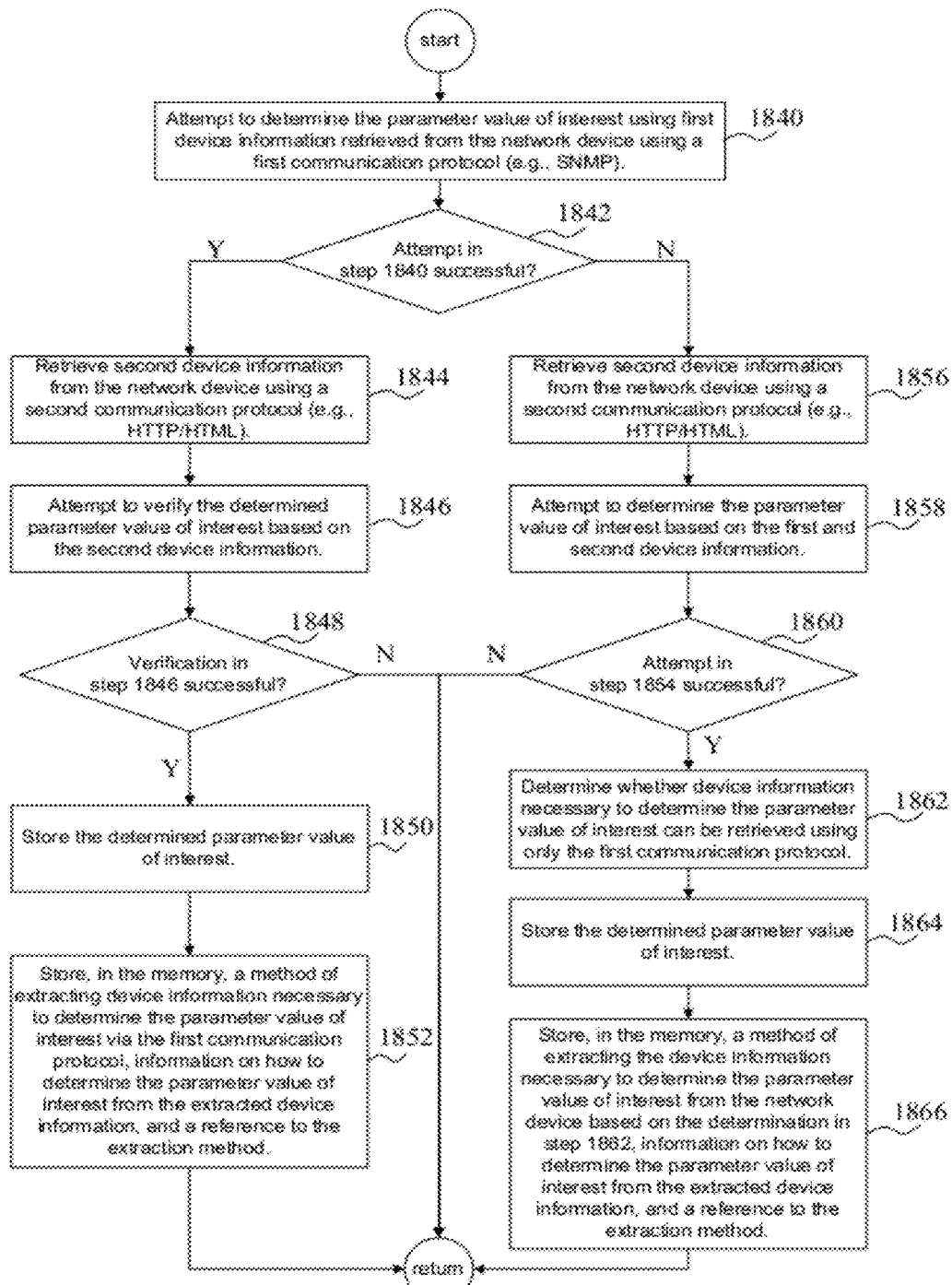

FIG. 18B illustrates an embodiment of a process performed by the remote support system when an unknown device is encountered for the first time. For example, the process of FIG. 18B begins when the system determines that the vendor device characteristics manager 1530 does not have extraction information for the unknown device in step 1804. The process begins at step 1840 at which time the system attempts to determine a parameter value of interest using first device information retrieved from the device using a first communication protocol (e.g., SNMP). In step 1842, a determination is made as to whether the attempt in step 1840 was successful.

The determination attempt in step 1840 is successful when, for example, the parameter value of interest can be extracted from, or calculated from, the first device information. The parameter value of interest may be calculated using predefined rules. These predefined rules define, for example, other parameter values that may be used to calculate the parameter value of interest. The determination attempt in step 1840 fails, for example, when the parameter value of interest is a percentage of toner remaining and the percentage itself cannot be retrieved using the first communication protocol, and/or the percentage of toner remaining cannot be computed from the first device information because the first device information does not include supply level of toner and/or maximum toner capacity information necessary for the computation. In another example, the determination attempt fails, when the parameter value of interest is for a supply level of a specific color of toner but the colors for the supply levels of the different toners cannot be identified using the first communication protocol. In this case, as further discussed below, second device information may be used to identify the corresponding colors.

When the attempt in step 1840 is successful, the process proceeds to step 1844, at which time second device information is retrieved from the device using a second communication protocol (e.g., HTTP/HTML). The parameter value of interest determined in step 1840 is then verified based on the second device information in step 1846. When the verification in step 1846 is successful, in step 1848 the determined parameter value of interest is stored in association with the network device in step 1850. If step 1848 determined that step 1846 is not successful, the system returns. Alternatively, the system sets the extraction method to be the second communication protocol and sets a flag to check for an SNMP extraction method again after a certain number of runs. Further, in step 1852, a method of extracting device information necessary to determine the parameter value of interest via the first communication protocol is stored and, if necessary, along with information on how to determine the parameter value of interest from the extracted device information. Further, a reference to the extraction method is stored in association with the device in step 1852.

For example, when the system successfully determines the parameter value of interest in step 1840, by calculating the percentage of toner remaining based on a supply level of toner and a maximum toner capacity retrieved using the first communication protocol, the system verifies the calculated percentage of toner remaining based on second device information retrieved using the second communication protocol. The second device information may include one or a combination of the percentage of toner remaining, a supply level of toner, and maximum toner capacity. Accordingly, in one embodiment, the system verifies the calculated percentage of toner remaining by comparing the calculated percentage with the percentage included in the second device information. In another example, the system verifies whether a determined supply level for a toner of a particular color is accurate based on a comparison with the second device information.

When the attempt in step 1840 is unsuccessful, the process proceeds to step 1856, at which time second device information is retrieved from the network device using the second communication protocol. The second device information retrieved in step 1856 may, but is not required to, be the same as the second device information retrieved in step 1844. After the second device information has been retrieved, in step 1858, the system attempts to determine the parameter value of interest based on the first and second device information. When the attempt in step 1860 is successful, the process proceeds to step 1862, at which time a determination is made as to whether device information necessary to determine the parameter value of interest can be retrieved using only the first communication protocol. If step 1860 determined that step 1858 is not successful, the system returns. Alternatively, the system sets the extraction method to be the second communication protocol and sets a flag to check for an SNMP extraction method again after a certain number of runs. In step 1864, the determined parameter value of interest is stored in association with the device. Further, in step 1866, an extraction method that defines a method of extracting the device information necessary to determine the parameter value of interest from the device, which is determined based on the determination in step 1858, is stored in a memory. Additionally, information on how to determine the parameter value of interest from the extracted device information, and a reference to the extraction method, are stored in the step 1866, if necessary.

For example, when the attempt by the system to determine the percentage of toner remaining in step 1840 is unsuccessful, the system retrieves second device information which includes, for example, one or a combination of the percentage of toner remaining, supply level of toner, or maximum toner capacity in step 1856. In step 1858, the system attempts to determine the percentage of toner remaining based on the first device information and the second device information. In one embodiment, when only the supply level of toner is included in the first device information, in step 1858, the system determines whether the percentage of toner remaining or the maximum toner capacity is included in the second device information and, when available, uses this information to determine the percentage of toner remaining. Further, when the supply level of toner and maximum toner capacity is not included in the first device information, the system attempts to determine the percentage of toner remaining from only the second device information.

When the attempt to determine the percentage of toner remaining is successful in the above example, in step 1862 the system determines whether device information necessary to determine the parameter value of interest can be retrieved using the first communication protocol. That is, the system determines whether the parameter value of interest can be extracted using the first communication protocol, or calculated from information retrievable using the first communication protocol and information on how to determine the parameter value of interest from the retrievable information. For example, based on a predefined rule, the system determines whether the supply level of toner can be retrieved using the first communication protocol and, when retrievable, stores an extraction method for the supply level of toner. In this example, the system also stores information on how to determine the parameter value of interest that indicates that the supply level of toner is to be divided by X (i.e., the toner maximum capacity) to compute the percentage of toner remaining. Alternatively, the information on how to determine the parameter value of interest can define how the value X is to be acquired from the first or second device information, rather than including the actual value.

In one embodiment, the system uses the second device information to assist in identifying the supply level of toner in the first device information, for example, the color corresponding to a particular toner value included in the first device information. As noted above, in another example, the system determines whether the percentage of remaining toner can be calculated from the first device information retrieved using the first communication protocol. The system, may determine that the percentage of remaining toner can be calculated by using a supply level of toner extracted from the first device information and by dividing the supply level by a predetermined amount.

As illustrated in FIG. 18B, when the verification in step 1846 or attempt in step 1858 is unsuccessful, the process of FIG. 18B ends. Alternatively, as noted above, the system sets the extraction method to be the second communication protocol and sets a flag to check for an SNMP extraction method again after a certain number of runs. The check for the SNMP extraction method may be repeated each time the certain number of runs has been performed. For example, when the system determines that the parameter value of interest can be determined from only device information retrieved using the second communication protocol, the system stores the determined parameter value of interest, the method of extracting device information necessary to determine the parameter value of interest via the second communication protocol, information on how to determine the parameter value of interest from the extracted device information, and a reference to the extraction method. In a further example, when a parameter value of interest can only be determined using the second communication protocol, the system tracks changes between the device information retrieved using the first and second communication protocols over a period of time to attempt to identify a method for extracting the parameter value of interest using the first communication protocol. When an extraction method using the first communication protocol is identified.

Figure 19:
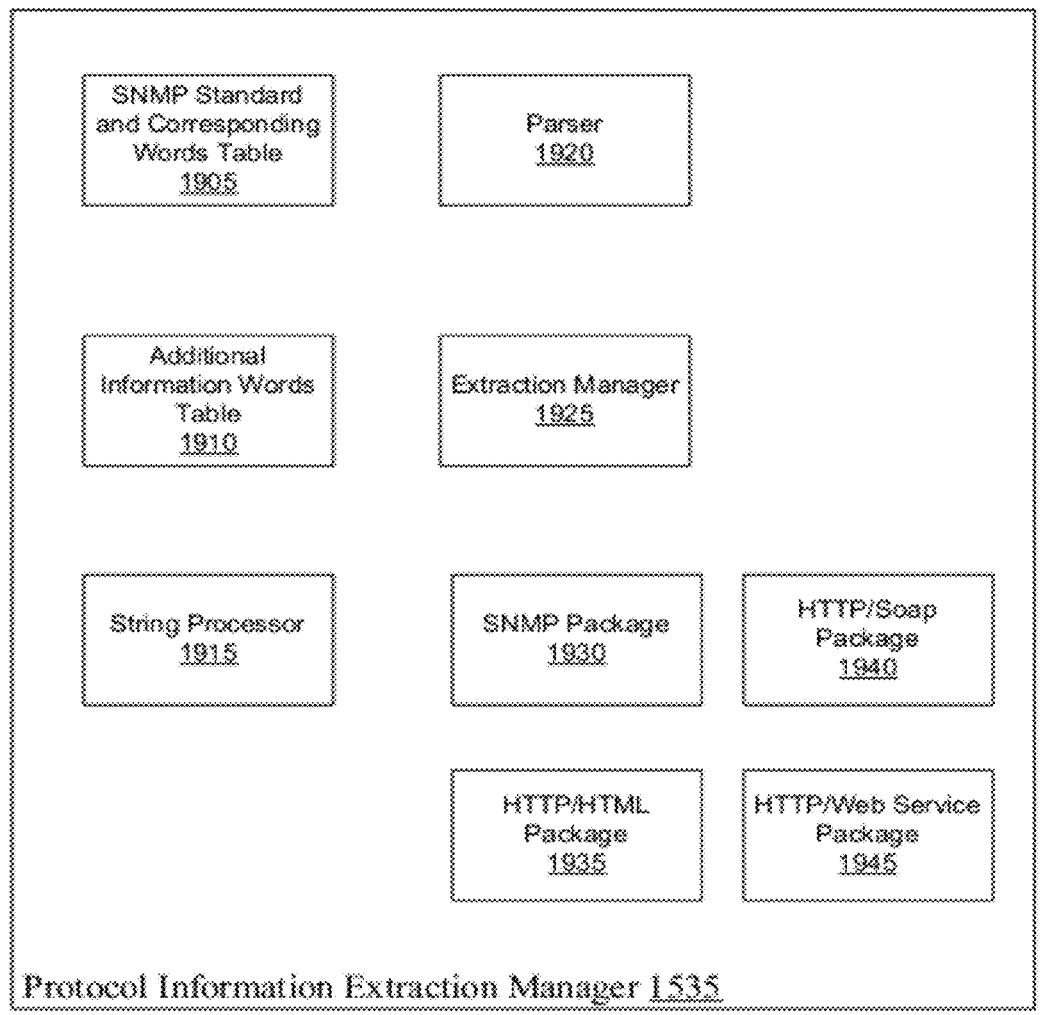
FIG. 19 illustrates an exemplary software block diagram of a Protocol Information Extraction Manager.

FIG. 19 shows an exemplary block diagram of the protocol information extraction manager 1535. As illustrated in FIG. 19, the protocol information extraction manager 1535 includes the SNMP standard and corresponding words table 1905, which contains keywords to assist in the extraction of information of interest from device information retrieved using SNMP, as shown in for example any one of FIGS. 12B to 12D. The protocol information extraction manager 1535 also includes an additional information words table 1910, which contains keywords to assist the extraction of additional information from the device information retrieved using HTTP/HTML, as shown in FIGS. 13 and 14.

The protocol information extraction manager 1535 also includes various elements used to facilitate the comparison of the device information acquired using SNMP and HTTP/HTML with the keyword tables. For example, a string processor 1915 contains utility tools to assist in string manipulation. A parser 1920 contains tools to parse various protocol data such as Abstract Syntax Notation 1 (ASN.1), Basic Encoding Rules (BER), HTML, JavaScript, etc. An extraction manager 1925 contains an overall manager to extract information from the data obtained through the various protocols. A SNMP package 1930 works with other blocks to process SNMP data from the device to extract information. An HTTP/HTML package 1930 works with other blocks to process HTML data from the device to extract the information. The protocol information extraction manager 1535, however, is not limited to using SNMP and HTTP/HTML. For example, the protocol information extraction manager 1535 can be programmed to support other protocols by including additional packages such as an HTTP/SOAP Package 1940, to provide an HTTP/SOAP interface with the network device, and an HTTP/Web Service Package 1945, which uses a Web Service to communicate with the network device. The protocol information extraction manager 1535 may support the other protocols in addition to or in place of SNMP and HTTP/HTML.

FIG. 20 shows an exemplary embodiment of the device information manager 1515. As illustrated in FIG. 20, the device information manager 1515 includes a device manager 2025 that controls the overall operation of the device information manager 1515 and interfaces with the other packages 1505 and 1520 illustrated in FIG. 15. Although the previous flow descriptions refer to the device configuration module 2010, the device information extraction module 2015, and the device status history module 2020, in one embodiment, those components are not directly exposed to the other packages. Instead, all the interfaces go through the device manager 2025. The device configuration module 2010 manages the configuration information of all the devices currently supported by the management appliance 1012. The device information extraction module 2015 manages the references to the information extraction methods using a table structure (map structure) to associate the device with extraction methods. Further, the device status history module 2020 manages the obtained status information, error information, and log information from the device. In another embodiment, the modules correspond to storage areas of one or more memories, or databases, for storing the respective information.

Figure 21:
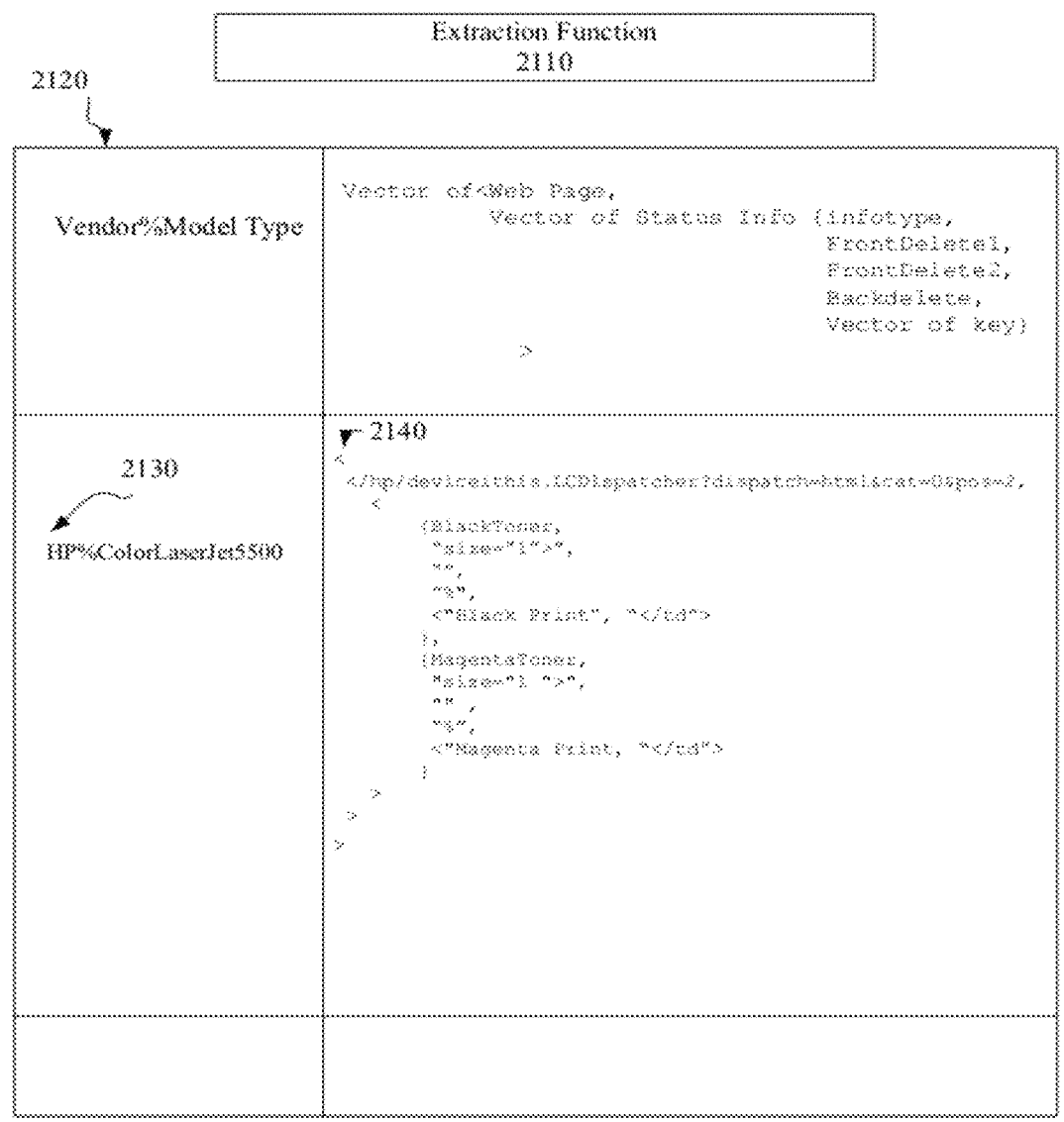
FIG. 21 illustrates an exemplary extraction function.

FIG. 21 is a simplified version of FIG. 41 in U.S. Pat. No. 7,574,489, which has been incorporated by reference. The extraction function 2110 is a function that uses the data in the table 2120 to extract the information from the target model of the target vendor. The function 2120 is described in further detail in U.S. Pat. No. 7,574,489. In one embodiment, the extraction function of FIG. 21 is a part of the vendor characteristic manager 1530, where the method to extract information is stored. The function 2110 accesses the web page in the table 2120 and obtains black and magenta toner levels using the front and back delete information along with the vector key. Delete information is used to delete the lines up to the point or after the point. Key vector is used to identify the value of interest.

FIG. 22 shows an example of the content of the device information extraction 2015 in the device information manager 1515. The table contains the device ID and the vector of references to the method and data to be used to extract the various information.

Numerous modifications and variations of the disclosed embodiments are possible in light of the above teachings. It is therefore to be understood that within the scope of the appended claims, the invention may be practiced otherwise than as specifically described herein.

The invention claimed is:

1. A method of extracting information from a network device, comprising:

retrieving, by a management device, first device information from the network device using a first communication protocol;

attempting, by the management device, to determine a parameter value of interest based on the first device information; and when the step of attempting to determine the parameter value of interest based on the first device information is unsuccessful, retrieving second device information from the network device using a second communication protocol, attempting, by the management device, to determine the parameter value of interest based on both the first device information and the second device information, and when the step of attempting to determine the parameter value of interest based on both the first device information and the second device information is successful, determining whether necessary device information to determine the parameter value of interest can be extracted using the first communication protocol, and storing in a memory, extraction information for the network device including a method of extracting the necessary device information to determine the parameter value of interest from the network device based on the determination by the step of determining, and information on how to determine the parameter value of interest from the extracted necessary device information.

2. The method according to claim 1, further comprising:

when the step of attempting to determine the parameter value of interest based on the first device information is successful, retrieving the second device information from the network device using the second communication protocol, and attempting to verify the determined parameter value of interest based on the second device information.

3. The method according to claim 2, further comprising:

when the determined parameter value of interest is successfully verified in the step of attempting to verify, storing the extraction information for the network device including a method of extracting device information necessary to determine the parameter value of interest from the network device via the first communication protocol, and the information on how to determine the parameter value of interest from the extracted necessary device information.

4. The method according to claim 1, wherein the step of retrieving the first device information comprises retrieving the first device information using the Simple Network Management Protocol (SNMP); and the step of retrieving the second device information comprises retrieving at least one web page of the network device using the Hypertext Transfer Protocol (HTTP).

5. The method according to claim 1, further comprising:
obtaining identification information from the network device using the first communication protocol;
determining whether the extraction information for the network device is stored in the memory, based on the obtained identification information; and
when the step of determining whether the extraction information for the network device is stored determines that the extraction information for the network device is not stored in the memory, performing the step of attempting to determine the parameter value of interest based on the first device information.

6. The method according to claim 1, wherein the step of determining whether necessary device information to determine the parameter value of interest can be extracted using the first communication protocol, comprises:
determining whether the parameter value of interest can be determined from the first device information.

7. A non-transitory computer-readable storage medium having embedded therein instructions, which when executed by a computer, cause the computer to perform a method of extracting information from a network device, comprising:
retrieving first device information from the network device using a first communication protocol;
attempting to determine a parameter value of interest based on the first device information; and
when the step of attempting to determine the parameter value of interest based on the first device information is unsuccessful,
retrieving second device information from the network device using a second communication protocol,
attempting to determine the parameter value of interest based on both the first device information and the second device information, and
when the step of attempting to determine the parameter value of interest based on both the first device information and the second device information is successful,
determining whether necessary device information to determine the parameter value of interest can be extracted using the first communication protocol, and
storing in a memory, extraction information for the network device including a method of extracting the necessary device information to determine the parameter value of interest from the network device based on the determination by the step of determining, and information on how to determine the parameter value of interest from the extracted necessary device information.

8. The non-transitory computer-readable storage medium according to claim 7, further comprising:
when the step of attempting to determine the parameter value of interest based on the first device information is successful,
retrieving the second device information from the network device using the second communication protocol, and
attempting to verify the determined parameter value of interest based on the second device information.

9. The non-transitory computer-readable storage medium according to claim 8, further comprising:
when the determined parameter value of interest is successfully verified in the step of attempting to verify, storing the extraction information for the network device including a method of extracting device information necessary to determine the parameter value of interest from the network device via the first communication protocol, and the information on how to determine the parameter value of interest from the extracted necessary device information.

10. The non-transitory computer-readable storage medium according to claim 7, wherein
the step of retrieving the first device information comprises retrieving the first device information using the Simple Network Management Protocol (SNMP); and
the step of retrieving the second device information comprises retrieving at least one web page of the network device using the Hypertext Transfer Protocol (HTTP).

11. The non-transitory computer-readable storage medium according to claim 7, further comprising:
obtaining identification information from the network device using the first communication protocol;
determining whether the extraction information for the network device is stored in the memory, based on the obtained identification information; and
when the step of determining whether the extraction information for the network device is stored determines that the extraction information for the network device is not stored in the memory, performing the step of attempting to determine the parameter value of interest based on the first device information.

12. The non-transitory computer-readable storage medium according to claim 7, wherein the step of determining whether necessary device information to determine the parameter value of interest can be extracted using the first communication protocol, comprises:
determining whether the parameter value of interest can be determined from the first device information.

13. A management device for extracting information from a network device, comprising:
a memory; and
a processor configured
to retrieve first device information from the network device using a first communication protocol;
to attempt to determine a parameter value of interest based on the first device information; and
when the attempt by the processor to determine the parameter value of interest based on the first device information is unsuccessful,
to retrieve second device information from the network device using a second communication protocol,
to attempt to determine the parameter value of interest based on both the first device information and the second device information, and
when the attempt by the processor to determine the parameter value of interest based on both the first device information and the second device information is successful,
to determine whether necessary device information to determine the parameter value of interest can be extracted using the first communication protocol; and
to store in the memory, extraction information for the network device including a method of extracting the necessary device information to determine the parameter value of interest from the network device based on the determination by the processor, and information on how to determine the parameter value of interest from the extracted necessary device information.

14. The management device according to claim 13, wherein the processor is configured
when the attempt by the processor to determine the parameter value of interest based on the first device information is successful,
to retrieve the second device information from the network device using the second communication protocol, and
to attempt to verify the determined parameter value of interest based on the second device information.

15. The management device according to claim 14, wherein the processor is configured
when the attempt to verify the determined parameter value of interest by the processor is successful, to store the extraction information for the network device including a method of extracting device information necessary to determine the parameter value of interest from the network device via the first communication protocol, and the information on how to determine the parameter value of interest from the extracted necessary device information.

16. The management device according to claim 13, wherein the processor is configured
to retrieve the first device information using the Simple Network Management Protocol (SNMP); and
to retrieve the second device information, which comprises at least one web page of the network device, using the Hypertext Transfer Protocol (HTTP).

17. The management device according to claim 13, wherein the processor is configured
to obtain identification information from the network device using the first communication protocol;
to determine whether the extraction information for the network device is stored in the memory, based on the obtained identification information; and
when the processor determines that the extraction information for the network device is not stored in the memory, to attempt to determine the parameter value of interest based on the first device information.

18. The management device according to claim 13, wherein the processor is configured to attempt to determine the parameter value of interest based on a first value included in the first device information and a second value included in the second device information.

19. The management device according to claim 13, wherein the processor is configured to attempt to compute the parameter value of interest based on a first value included in the first device information and a second value included in the second device information.

20. The management device according to claim 13, wherein the processor is configured to determine whether the necessary device information to determine the parameter value of interest can be extracted using the first communication protocol based on whether the parameter value of interest can be determined from the first device information.

* * * * *